United States Patent
Iguchi et al.

(10) Patent No.: US 10,536,676 B2
(45) Date of Patent: Jan. 14, 2020

(54) PROJECTION APPARATUS, CONTROL METHOD, AND STORAGE MEDIUM

(71) Applicant: CANON KABUSHIKI KAISHA, Tokyo (JP)

(72) Inventors: Shota Iguchi, Yokohama (JP); Hideaki Yui, Machida (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/057,531

(22) Filed: Aug. 7, 2018

(65) Prior Publication Data

US 2019/0052850 A1 Feb. 14, 2019

(30) Foreign Application Priority Data

Aug. 10, 2017 (JP) .................................. 2017-155264
Apr. 20, 2018 (JP) .................................. 2018-081159

(51) Int. Cl.
*H04N 9/31* (2006.01)

(52) U.S. Cl.
CPC ......... *H04N 9/3182* (2013.01); *H04N 9/3105* (2013.01); *H04N 9/3123* (2013.01); *H04N 9/3147* (2013.01); *H04N 9/3185* (2013.01)

(58) Field of Classification Search
CPC .. G03B 21/13; G03B 21/147; G03B 21/2053; H04N 9/3105; H04N 9/3123; H04N 9/3147; H04N 9/3182; H04N 9/3185
See application file for complete search history.

(56) References Cited

U.S. PATENT DOCUMENTS

| | | | |
|---|---|---|---|
| 6,513,938 B2 | 2/2003 | Kubota | |
| 6,760,075 B2 | 7/2004 | Mayer, III | |
| 7,832,869 B2 * | 11/2010 | Maximus | G02B 26/007 353/7 |
| 2007/0002082 A1 * | 1/2007 | Sakurai | G09G 3/3648 345/691 |
| 2007/0103644 A1 * | 5/2007 | Nakamura | G02B 13/22 353/31 |
| 2008/0259223 A1 * | 10/2008 | Read | H04N 9/3147 348/745 |
| 2014/0104582 A1 * | 4/2014 | Mori | H04N 9/3185 353/30 |
| 2016/0073070 A1 * | 3/2016 | Spearman | H04N 9/3185 348/745 |
| 2016/0150184 A1 * | 5/2016 | Gandhi | H04N 7/15 348/14.08 |
| 2016/0150204 A1 * | 5/2016 | Tanaka | H04N 9/3147 353/30 |

FOREIGN PATENT DOCUMENTS

| | | |
|---|---|---|
| JP | 2001-268476 A | 9/2001 |
| JP | 2004-507954 A | 3/2004 |

* cited by examiner

*Primary Examiner* — Sultan Chowdhury
(74) *Attorney, Agent, or Firm* — Canon USA, Inc., IP Divison

(57) ABSTRACT

A projection apparatus that projects a projection image includes a first panel, a second panel, a projection optical system that projects light that has passed through the first panel and the second panel, an information acquisition unit that acquires light reduction information of a region which is a part of the projection image and overlaps with an image projected by another projection apparatus, and a panel control unit that controls the first panel based on data of the projection image and controls the second panel based on the light reduction information.

22 Claims, 23 Drawing Sheets

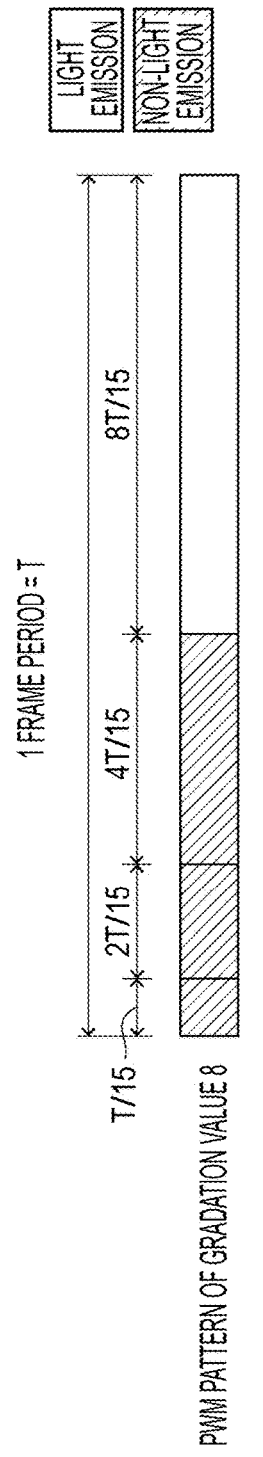
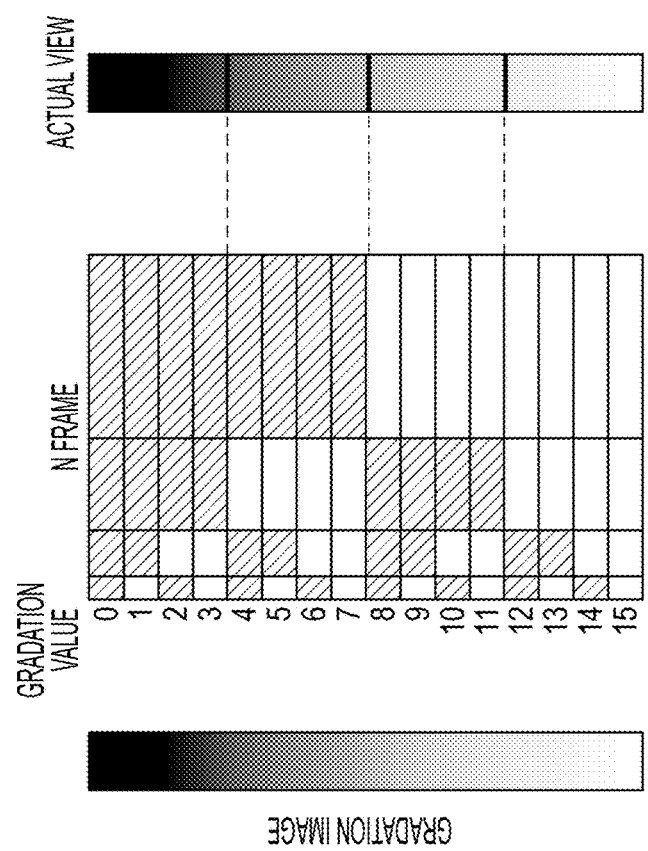

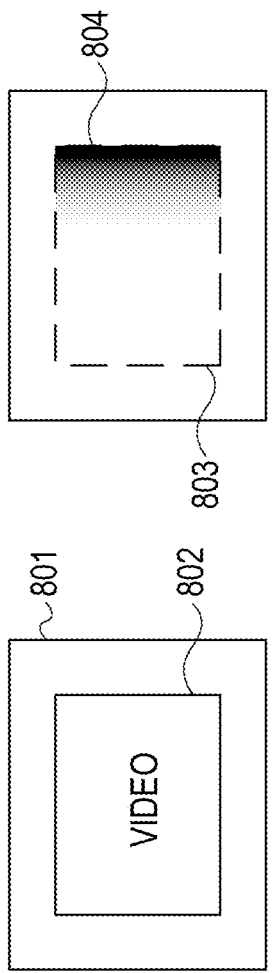
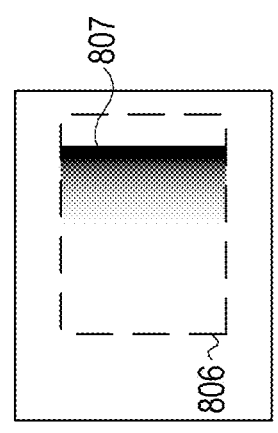
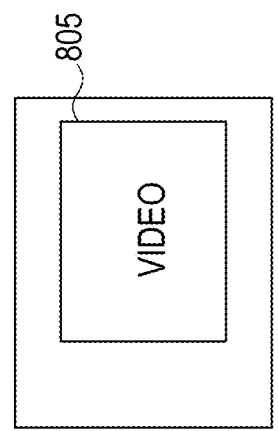
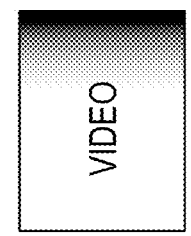
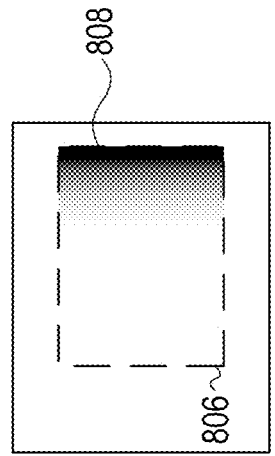
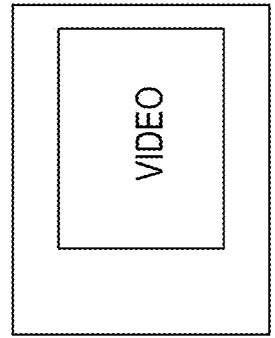

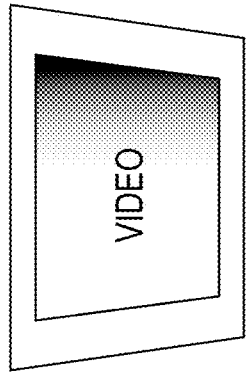
FIG. 12A
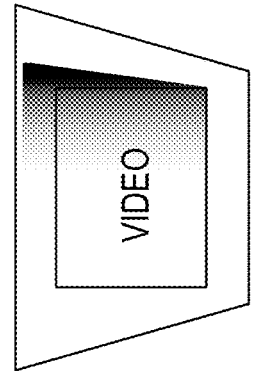
FIG. 12B
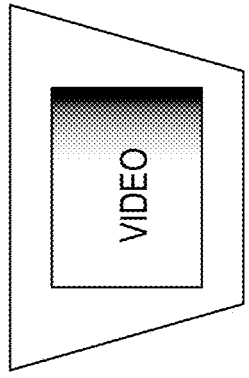
FIG. 12C
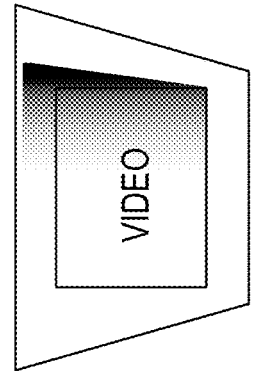
FIG. 12D
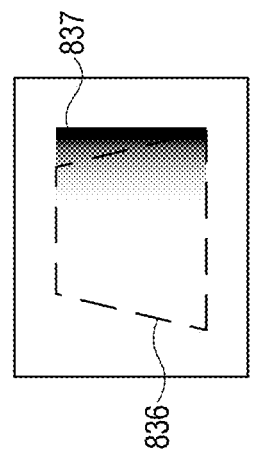
FIG. 12E
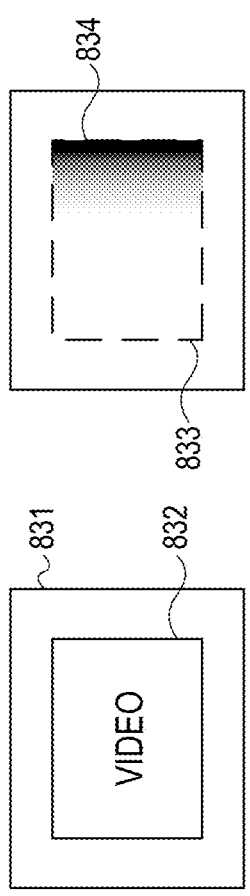
FIG. 12F
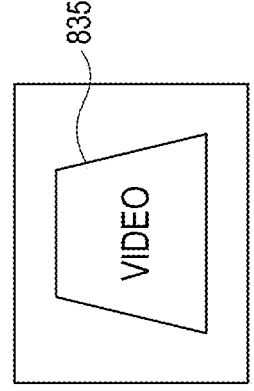
FIG. 12G
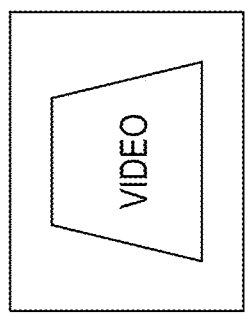
FIG. 12H
FIG. 12I

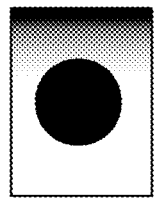
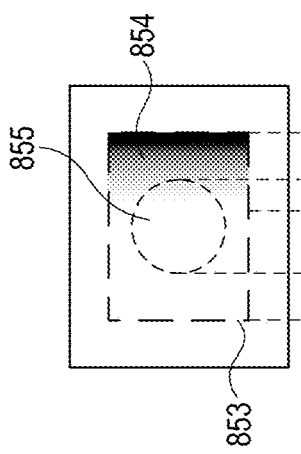
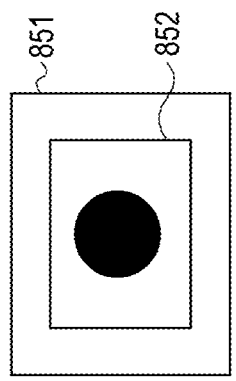
FIG. 16C
FIG. 16B
FIG. 16A
FIG. 16D
FIG. 16E
FIG. 16F

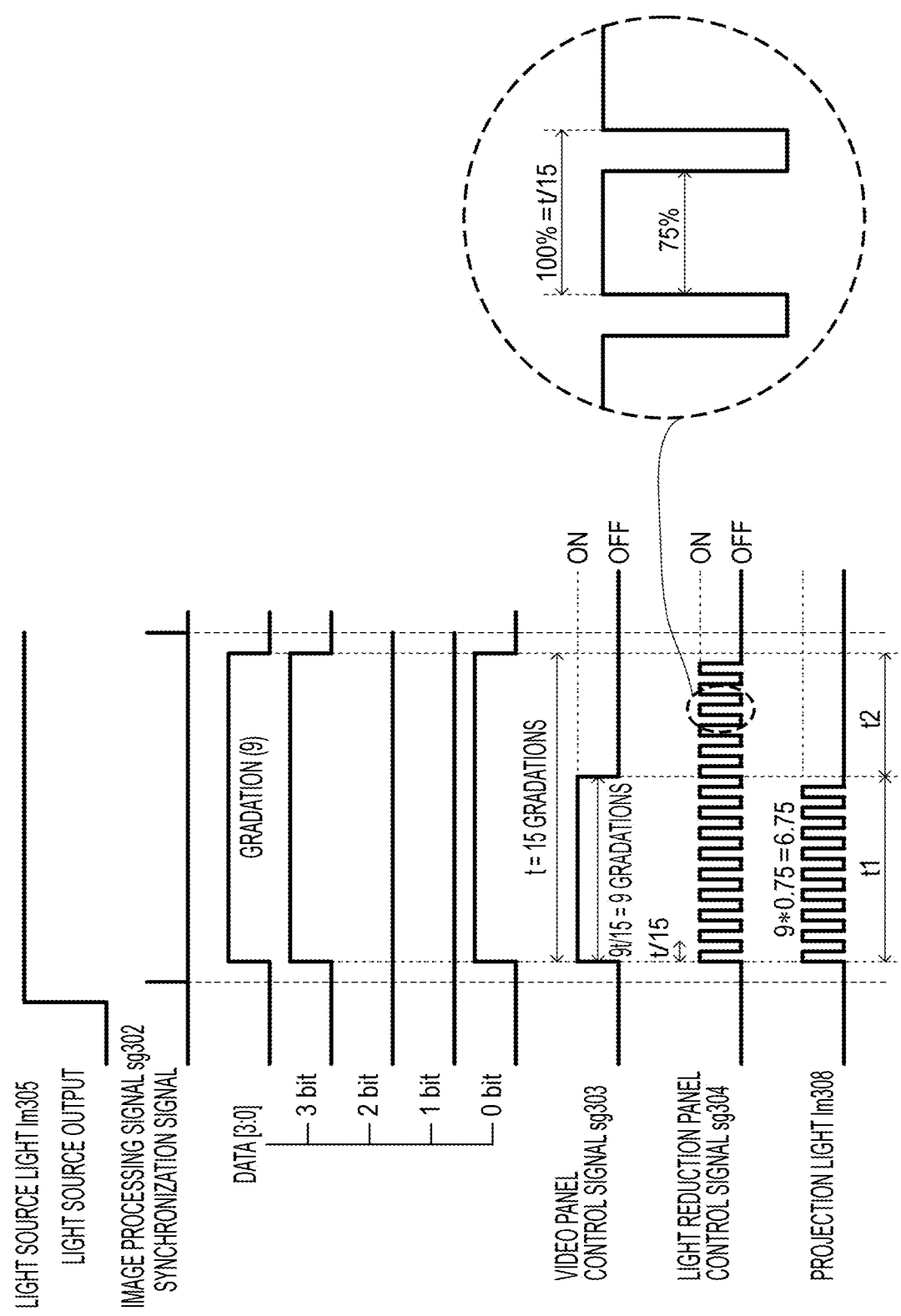

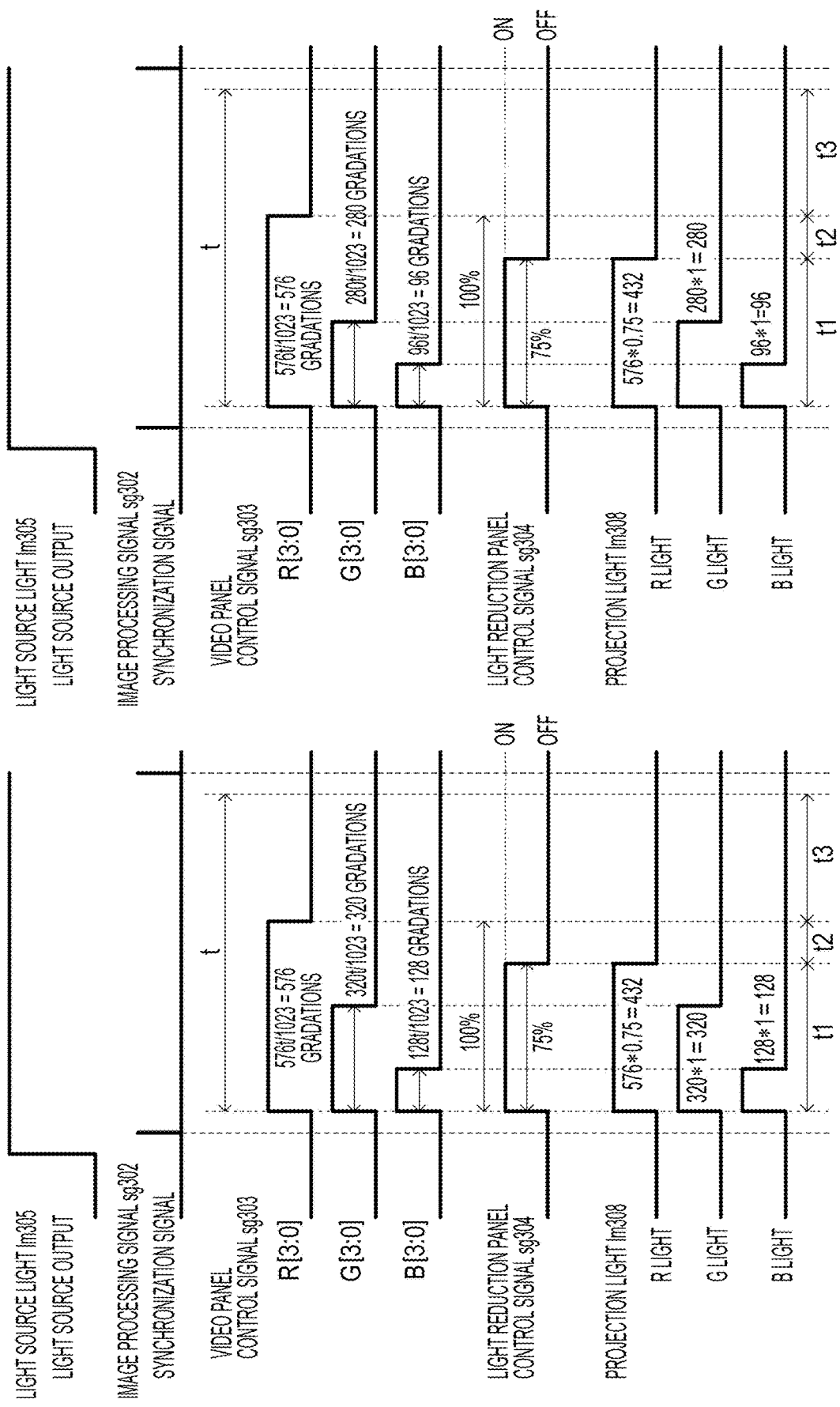
FIG. 20A / FIG. 20B

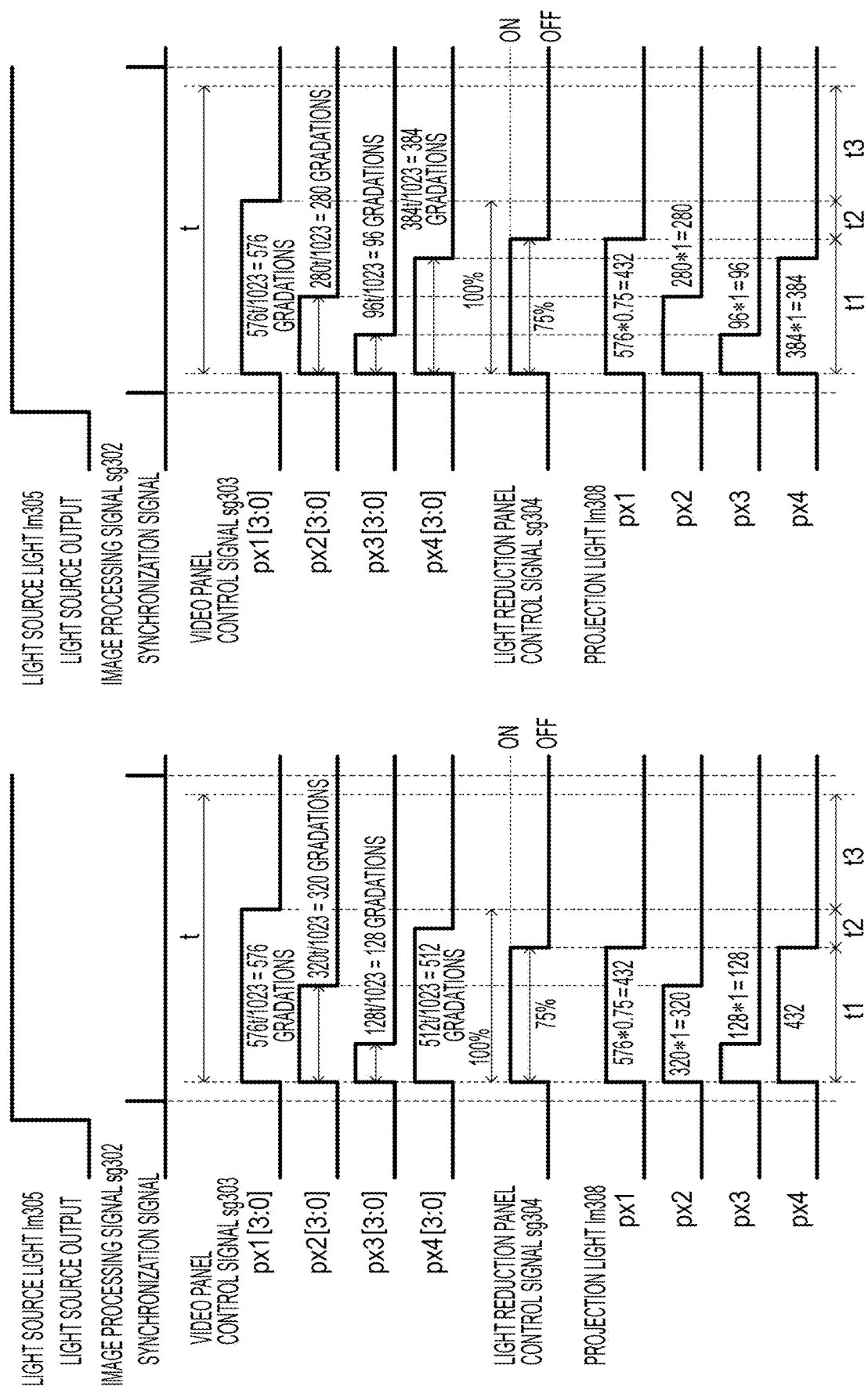

PROJECTION APPARATUS, CONTROL METHOD, AND STORAGE MEDIUM

BACKGROUND

Field of the Disclosure

The present disclosure generally relates to projection and, more particularly, to a projection apparatus, a control method of a projection apparatus, and a storage medium.

Description of the Related Art

A multiple projection system has been proposed which can project one large image by using a plurality of projectors and connecting together images projected from the projectors on a screen used as a projection surface.

In the multiple projection system, a method is known which makes a luminance level difference between an overlap region and a non-overlap region inconspicuous by overlapping end portions of projection images and reducing/adjusting the luminance of the overlap region in order to make a connection portion between the projection images hardly visually recognized. This method is called edge blending processing. As a typical method, there is processing that gradually reduces luminance toward an end portion of a screen in an overlap region of projection images (hereinafter referred to as gradation processing). By doing so, the luminance level difference becomes inconspicuous.

However, in this method, it is not possible to correct a luminance level difference between an overlap region and a non-overlap region when black displays are overlapped. Normally, when a display device is used, even if black is displayed, light leaks from a display element, so that there is some luminance and brightness can be visually recognized. When black displays are overlapped, the luminance of the overlap region is about twice the luminance of a portion where black is displayed in a non-overlap region. However, an input signal of the black display portion is 0, so that it is not possible to lower the luminance of the overlap region and match the luminance of the overlap region and the non-overlap region.

PCT Japanese Translation Patent Publication No. 2004-507954 deals with this problem and is a processing method that raises the luminance of the non-overlap region to match the luminance of the overlap region without lowering the luminance of the overlap region. This processing method is called black floating correction processing.

Further, Japanese Patent Laid-Open No. 2001-268476 discloses a technique that performs light shielding of periphery of a projection image by providing a liquid crystal panel in a projector.

However, the black floating correction raises the luminance of the non-overlap region in the black display, so that the black floating correction degrades contrast that is determined by a relationship between a peak luminance by a full input signal and the luminance of the black display. When the contrast is degraded, sharpness of an image is also degraded, so that the quality of the image generally becomes undesirable.

Further, in Japanese Patent Laid-Open No. 2001-268476, a user manually sets a region to be shielded from light while viewing a screen, so that the operation of the user is troublesome.

SUMMARY

The present disclosure addresses these areas by providing a projection apparatus that can simply suppress black floating in an overlap region while suppressing deterioration of contrast.

According to one or more aspects of the present disclosure, a projection apparatus that projects a projection image includes a first panel, a second panel, a projection optical system that projects light that has passed through the first panel and the second panel, an information acquisition unit that acquires light reduction information of a region which is a part of the projection image and overlaps with an image projected by another projection apparatus, and a panel control unit that controls the first panel based on data of the projection image, and controls the second panel based on the light reduction information.

Further features of the present disclosure will become apparent from the following description of exemplary embodiments (with reference to the attached drawings).

BRIEF DESCRIPTION OF THE DRAWINGS

FIGS. 6A and 6B are diagrams for explaining image quality disturbance generated when controlling a liquid crystal element by using a PWM driving method.

FIGS. 10A to 10I are diagrams for explaining about movement correction.

FIGS. 12A to 12I are diagrams for explaining about trapezoid correction.

FIGS. 16A to 16F are diagrams schematically showing a relationship between a display state of each display element and a projection image when performing processing considering both light reduction information and image data.

FIG. 19 is a time chart for explaining a signal processing to be a feature of a seventh embodiment.

FIGS. 20A and 20B are time charts for explaining a signal processing to be a feature of an eighth embodiment.

FIGS. 22A and 22B are time charts for explaining a signal processing to be a feature of the eighth embodiment.

DESCRIPTION OF THE EMBODIMENTS

Hereinafter, various embodiments, features, and aspects of the present disclosure will be described in detail with reference to the drawings. However, the present disclosure is not limited to the embodiments described below.

First Embodiment

In the present embodiment, as an example of a projection apparatus, a digital light processing (DLP) system projector using a display element such as a digital micromirror device (DMD) will be described.

Further, in the present embodiment, a projector that displays an image by using three of the DMDs mentioned above and separately uses one analog control type transparent liquid crystal display element for gradation processing will be described as an example. The three DMDs are used to modulate light separated into red color (R), green color (G), and blue color (B), respectively.

The projector of the present embodiment presents an image to a user by controlling reflection and transmission of light of the display element according to an image to be displayed and projecting light from a light source reflected by or transmitted through the display element onto a screen.

For ease of description, in the present embodiment, an example is used where each pixel of an image is represented by 16 gradation levels of 0 to 15.

Hereinafter, such a projector will be described.

Outline of First Embodiment

Figure 1:
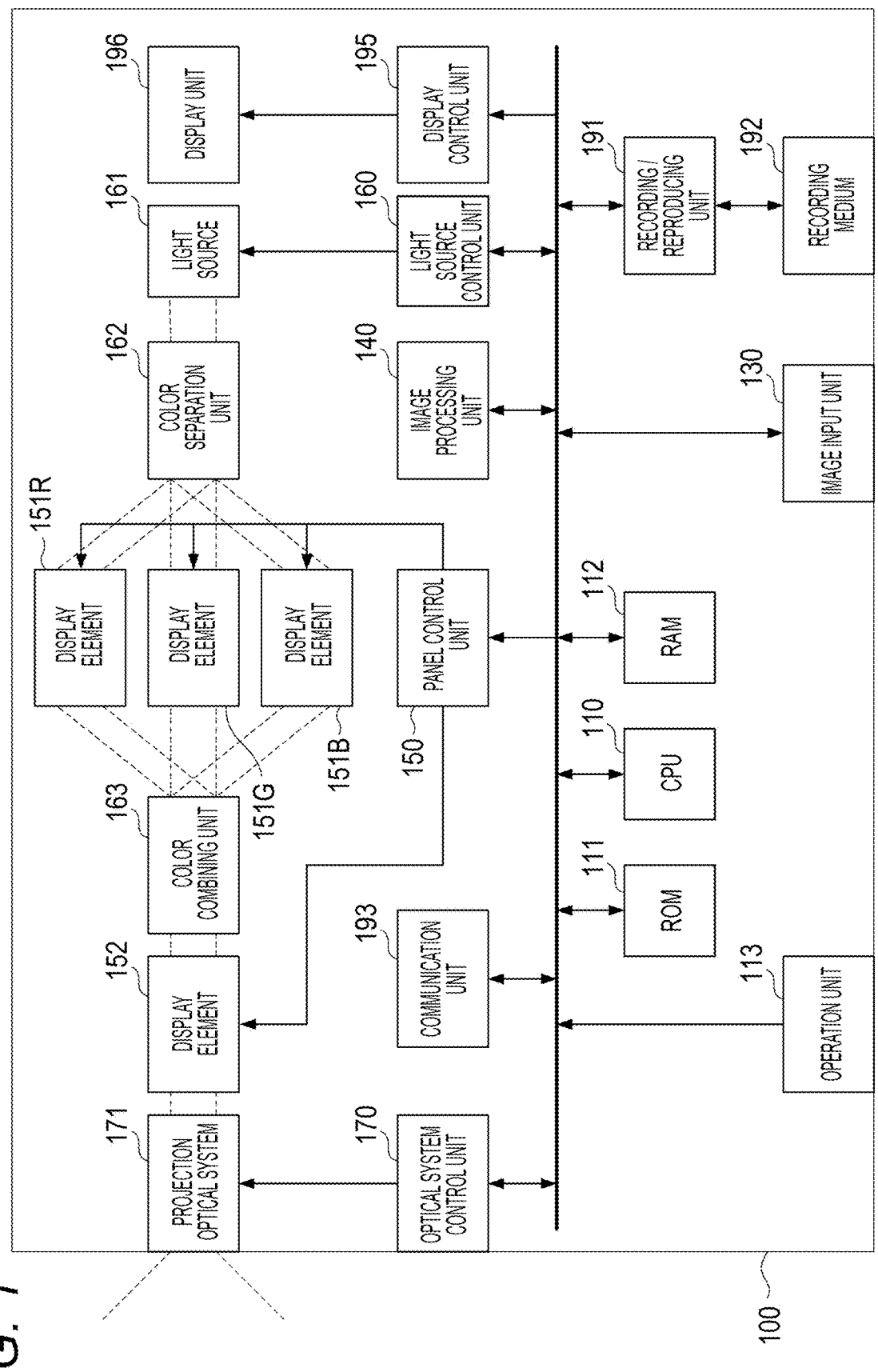
FIG. 1 is a diagram showing a configuration of an entire projector 100.

FIG. 1 is a diagram showing a configuration of a projector 100. The projector 100 of the present embodiment has a central processing unit (CPU) 110, a read only memory (ROM) 111, a random access memory (RAM) 112, an operation unit 113, an image input unit 130, an image processing unit 140, a panel control unit 150, display elements (151R, 151G, and 151B), and a display element 152. Further, the projector 100 has a light source 161, a light source control unit 160, a color separation unit 162, a color combining unit 163, an optical system control unit 170, a projection optical system 171, a recording/reproducing unit 191, a recording medium 192, a communication unit 193, a display control unit 195, and a display unit 196.

The CPU 110, which may include one or more processors and one or more memories, may control each operation block of the projector 100 by using a program stored in the ROM 111 described later. The CPU 110 controls each operation block of the projector 100 by receiving a control signal inputted from the operation unit 113 or the communication unit 193.

The CPU 110 temporarily stores still image data or video image data acquired by the recording/reproducing unit 191 from the recording medium 192 into the RAM 112 and reproduces the still image or the video image by using the program stored in the ROM 111. The CPU 110 temporarily can store still image data or video image data received by the communication unit 193 into the RAM 112 and reproduce the still image or the video image by using the program stored in the ROM 111.

The ROM 111 stores a control program that describes a processing procedure of the CPU 110. The RAM 112 temporarily stores the control program and data as a work memory.

The operation unit 113 receives a user's instruction and transmits an instruction signal to the CPU 110. The operation unit 113 includes a signal receiving unit that receives a signal from, for example, a switch, a dial, a touch panel provided on the display unit 196, or a remote control. The operation unit 113 transmits an instruction signal based on the received signal to the CPU 110.

The image input unit 130 includes, for example, a card interface, a universal serial bus (USB) interface, an S-video terminal, a D-terminal, a component terminal, an analog RGB terminal, a DVI-I terminal, a DVI-D terminal, or an HDMI (registered trademark) terminal.

The image processing unit 140 performs change processing of, for example, the number of frames, the number of pixels, and a shape of an image on image data received from the image input unit 130. Specifically, the image processing unit 140 performs frame thinning processing, frame interpolation processing, resolution conversion (scaling) processing, and distortion correction processing (keystone correction processing). Further, the image processing unit 140 performs the aforementioned changing processing on an image or a video reproduced by the CPU 110. The image processing unit 140 transmits the image data on which the change processing is performed to the panel control unit 150.

The panel control unit 150 controls a display element 151. For example, the panel control unit 150 controls reflection of the display elements 151R, 151G, and 151B by controlling voltages applied to the display elements 151R, 151G, and 151B on the basis of the image data processed by the image processing unit 140. The panel control unit 150 performs control so that the reflection of the display elements 151R, 151G, and 151B becomes reflection of light corresponding to the image data received from the image processing unit 140.

The panel control unit 150 adjusts luminance of a projection image by controlling the display element 152. Specifically, the panel control unit 150 controls a transmittance ratio of pixels corresponding to an overlap region in the display element 152 on the basis of a luminance setting value acquired by an information acquisition unit 114. The overlap region is a region to be a target of edge blending processing.

The display elements 151R, 151G, and 151B are panels that represent gradation by time-modulating optical characteristics of pixels on the basis of pixel values of image data. A first panel (hereinafter referred to as a time modulation panel) is, for example, DMD and is used for a DLP system projector. The DMD has a micromirror for each pixel arranged on a matrix, and each micromirror maintains either an ON state or an OFF state of two angles different from each other (so-called binary control). Specifically, the micromirror has an angle in which light emitted from a light source to the micromirror is reflected to a projection optical system (the ON state) or an angle in which the light is reflected to an internal absorbent body and is not emitted to the outside (the OFF state). A digital signal that drives the DMD is a signal that adjusts a time ratio of the ON state of each micromirror by, for example, a pulsed wave modulation (PWM) driving method and represents gradation for each pixel to be displayed. The digital signal when a pixel value is represented by 16 gradation levels is a four-bit binary signal. Hereinafter, when the display elements 151R, 151G, and 151B need not be particularly distinguished from each other, the display elements 151R, 151G, and 151B are written as the display element 151.

The display element 151R is a display element corresponding to red color and is for adjusting a reflection ratio of red color of the light separated into red color (R), green color (G), and blue color (B) by the color separation unit 162 of light emitted from the light source 161. The display element 151G is a display element corresponding to green color and is for adjusting a reflection ratio of green color of the light separated into red color (R), green color (G), and blue color (B) by the color separation unit 162 of light emitted from the light source 161. The display element 151B is a display element corresponding to blue color and is for adjusting a reflection ratio of blue color of the light separated into red color (R), green color (G), and blue color (B) by the color separation unit 162 of light emitted from the light source 161.

The display element 152 is a second panel (hereinafter referred to as an amplitude modulation panel) that represents gradation by amplitude-modulating optical characteristics of pixels on the basis of a luminance setting value. The luminance setting value is, for example, light reduction information related to gradation processing for edge blending.

Figure 15C:
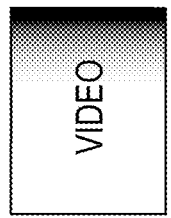
FIGS. 15A to 15D are diagrams schematically showing a relationship between a display state of each display element and a projection image when performing light reduction processing.

Here, the light reduction information will be described with reference to FIGS. 15A to 15D. FIGS. 15A to 15D are diagrams schematically showing a relationship between a display state on the display element 151 and the display element 152 and a projection image projected by the projector 100. FIG. 15A is a diagram schematically showing a state where a video signal is drawn in a part of a displayable region 841 included in the display element 151. In FIG. 15A, a drawing region 842 is a region where the video signal is drawn in the displayable region 841 of the display element 151.

Figure 15B:
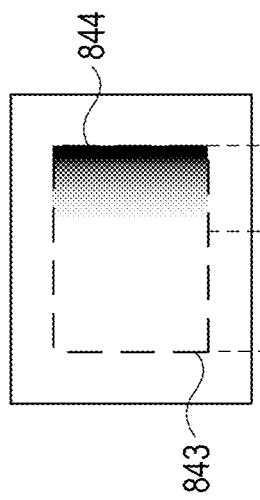
Figure 15D:
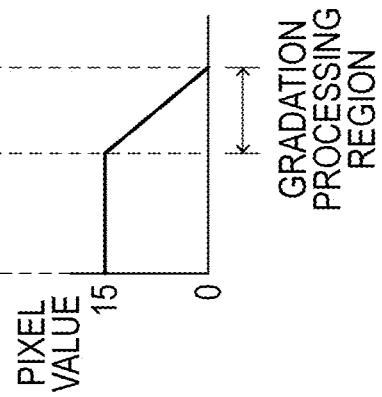
Figure 15A:
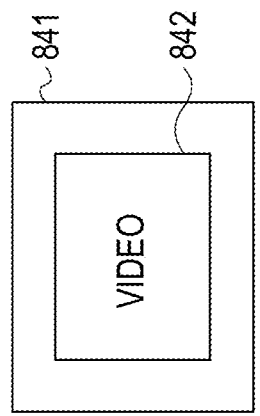

FIG. 15B is a diagram schematically showing a relationship between a drawing corresponding region 843 and a gradation processing region 844 in the display element 152. The drawing corresponding region 843 is a region corresponding to the drawing region 842 of the display element 151 in the display element 152. The gradation processing region 844 is a region where the gradation processing is applied in the display element 152. As shown in FIG. 15D, in the gradation processing region 844, the pixel value is 0 at the right end portion, the pixel value is linearly increased from the right end portion, and the pixel value reaches 15 (maximum value) at the left end portion of the gradation region. In a region other than the gradation processing region 844 in the drawing corresponding region 843, all pixels have a pixel value of 15. The panel control unit 150 performs voltage control corresponding to each pixel value and the display element 152 has a desired transmittance ratio.

That is to say, the light reduction information includes region information indicating the gradation processing region 844 in the display element 152 and pixel values indicating the luminance of the pixels or the transmittance ratio of the pixels.

Although a relationship between the resolution of the display element 151 and the resolution of the display element 152 is optional, the resolution of the display element 151 may be greater than the resolution of the display element 152. The resolution for the gradation processing is lower than the resolution for representing a video image, so that when setting the resolution of the display element 152 to lower than the resolution of the display element 151, the cost of the display element 152 can be reduced.

The light source control unit 160 controls ON/OFF of the light source 161 and the intensity of the light emitted from the light source 161.

The light source 161 is a light emitting unit that emits light for projecting an image onto a screen. The light source 161 includes, for example, a halogen lamp, a xenon lamp, or a high-pressure mercury lamp.

The color separation unit 162 separates the light emitted from the light source 161 into red color (R), green color (G), and blue color (B). The color separation unit 162 includes, for example, a dichroic mirror and a prism. When the projector 100 uses a light emitting diode (LED) corresponding to each color as the light source 161, the projector 100 need not include the color separation unit 162.

The color combining unit 163 combines lights of red color (R), green color (G), and blue color (B) reflected by the display elements 151R, 151G, and 151B. The color combining unit 163 includes, for example, a dichroic mirror and a prism. The color combining unit 163 outputs light formed by combining components of red color (R), green color (G), and blue color (B) to the projection optical system 171.

The optical system control unit 170 is a projection control unit that causes the projection optical system 171 to project a projection image whose luminance is adjusted by at least either of the display element 151 or the display element 152. Specifically, the optical system control unit 170 controls an operation of a lens drive actuator of the projection optical system 171 and, for example, changes a zoom magnification and adjusts the focus of an image.

The projection optical system 171 is a projection unit that includes, for example, a plurality of lenses and a lens driving actuator and projects the light outputted from the color combining unit 163 onto the screen. The projection optical system 171 performs enlargement and reduction of an image and focus adjustment by driving a lens with an actuator. The projection optical system 171 projects the light combined by the color combining unit 163 onto the screen, so that an image corresponding to an image to be displayed is displayed on the screen.

The recording/reproducing unit 191 acquires still image data or video image data from the recording medium 192 described later. The recording/reproducing unit 191 may cause the recording medium 192 to record still image data or video image data received by the communication unit 193. The recording/reproducing unit 191 includes, for example, an interface that electrically connects to the recording medium 192 and a microprocessor for communicating with the recording medium 192.

The recording medium 192 is a recording medium that records, for example, still image data, video image data, and control data to control the projector 100. The recording medium includes, for example, a magnetic disk, an optical disc, or a semiconductor memory, and may be a detachable recording medium or a built-in type recording medium.

The communication unit 193 is a communication interface that receives a control signal, still image data, video image data from an external apparatus. The communication unit 193 may include, for example, a wireless LAN (Local Area Network), a wired LAN, USB, and Bluetooth (registered trademark), and a communication method is not particularly limited. When the image input unit 130 includes an HDMI terminal, the communication unit 193 may perform CEC communication through the HDMI terminal. The external apparatus is an apparatus which can communicate with the projector 100 and which is, for example, a personal computer, a camera, a mobile phone, a smartphone, an HDD recorder, a game machine, and a remote control.

The display control unit 195 controls the display unit 196 included in the projector 100 and causes the display unit 196 to display, for example, an operation screen and images of switch icons for operating the projector 100.

The display unit 196 displays the operation screen and the switch icons for operating the projector 100. The display unit 196 may be, for example, a liquid crystal display, a CRT display, an organic EL display, and an LED display. The display unit 196 may be any device that can display an image.

In the above description, the image processing unit 140, the panel control unit 150, the light source control unit 160, the optical system control unit 170, the recording/reproducing unit 191, and the display control unit 195 may have a microprocessor that can perform the same processing as those of these operation blocks. Further, the CPU 110 may function as the image processing unit 140, the panel control unit 150, the light source control unit 160, the optical system control unit 170, the recording/reproducing unit 191, and the display control unit 195 by executing a program stored in the ROM 111.

The units described throughout the present disclosure are exemplary and/or preferable modules for implementing processes described in the present disclosure. The term "unit", as used herein, may generally refer to firmware, software, hardware, or other component, such as circuitry or the like, or any combination thereof, that is used to effectuate a purpose. The modules can be hardware units (such as circuitry, firmware, a field programmable gate array, a digital signal processor, an application specific integrated circuit or the like) and/or software modules (such as a computer readable program or the like). The modules for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the present disclosure.

[Basic Operation of Projector 100]

Figure 2:
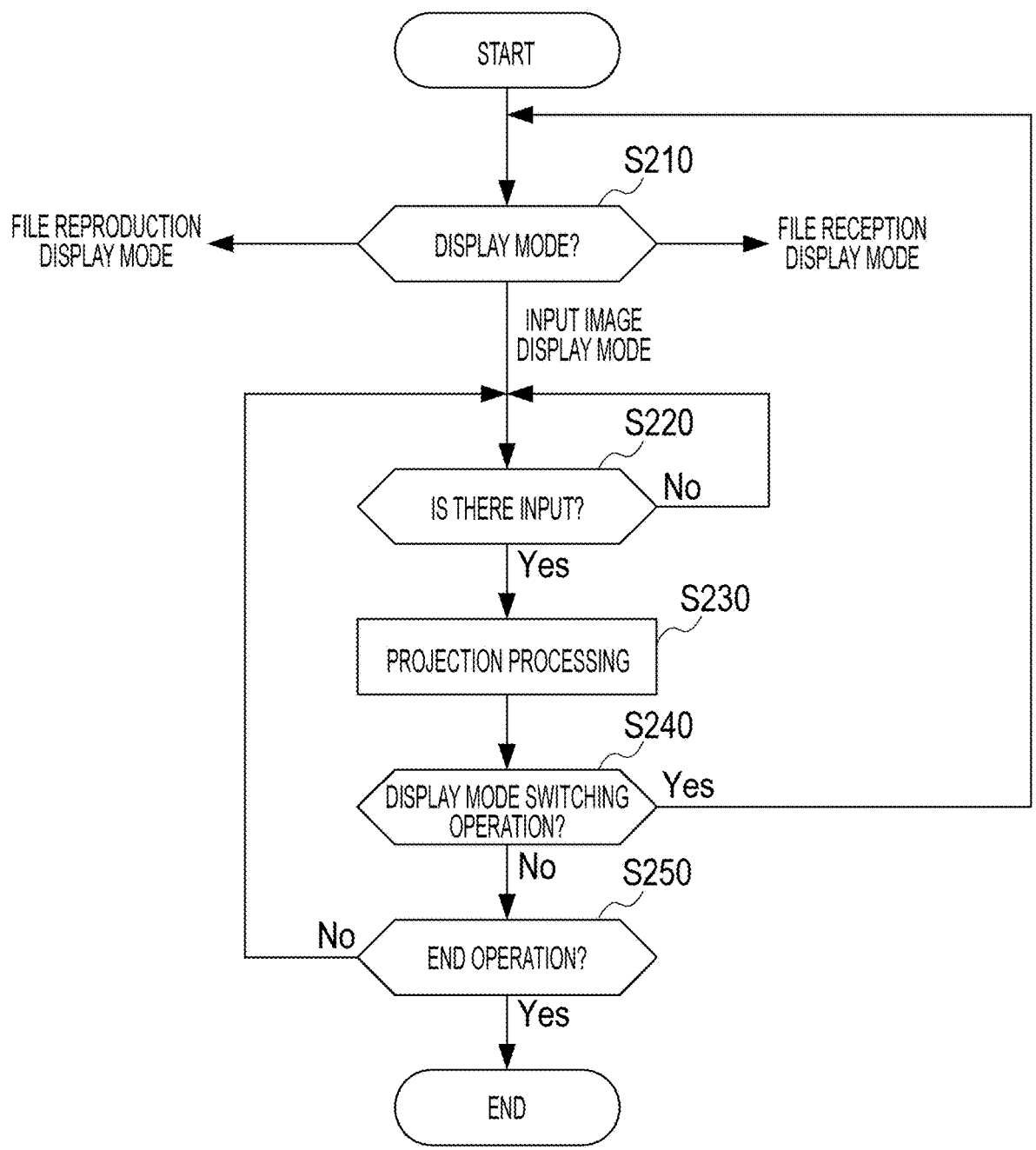
FIG. 2 is a flowchart for explaining control of a basic operation of the projector 100 of the present disclosure.

Next, a basic operation of the projector 100 of the present embodiment will be described with reference to FIG. 2. FIG. 2 is a basic operation flowchart of the projector 100. The operation shown in FIG. 2 is realized when the CPU 110 executes the program stored in the ROM 111 and controls each operation block. In the flowchart of FIG. 2, it is assumed that a user instructs the projector 100 to turn on by using the operation unit 113 or a remote control. When the CPU 110 receives an instruction of power ON from the user, the CPU 110 controls a power supply circuit and causes the power supply circuit to supply power to each operation block.

Next, the CPU 110 determines a display mode selected by the user by an operation of the operation unit 113 or the remote control (S210). One of display modes of the projector 100 of the present embodiment is an "input image display mode" which displays an image or a video acquired by the image input unit 130. Further, one of the display modes of the projector 100 of the present embodiment is a "file reproduction display mode" which displays an image included in still image data acquired by the recording/reproducing unit 191 from the recording medium 192 or a video included in video image data acquired by the recording/reproducing unit 191 from the recording medium 192.

Further, one of the display modes of the projector 100 of the present embodiment is a "file reception display mode" which displays an image included in still image data received by the communication unit 193 or a video included in video image data received by the communication unit 193. In the present embodiment, a case where a display mode is selected by a user will be described. The display mode at a time point when the CPU 110 receives an instruction of power ON may be a display mode used when the previous operation is completed or any one of the display modes described above.

When the "input image display mode" is selected, the CPU 110 determines whether or not the image input unit 130 acquires an image (S220). When the image input unit 130 does not acquire an image (No in S220), the CPU 110 waits until the image input unit 130 acquires an image. When the image input unit 130 acquires an image (Yes in S220), the CPU 110 performs projection processing (S230).

Hereinafter, the projection processing (S230) will be described in detail.

First, the CPU 110 transmits the image acquired by the image input unit 130 to the image processing unit 140 and causes the image processing unit 140 to perform image processing. The image processing unit 140 performs change processing of the number of pixels, a frame rate, and a shape of an image. The image processing unit 140 inputs one screen of a processed image into the panel control unit 150.

Next, the panel control unit 150 controls reflection of the display elements 151R, 151G, and 151B so that the reflection corresponds to gradation levels of each color component of red color (R), green color (G), and blue color (B) of the received one screen of image. The light source control unit 160 controls intensity of light emitted from the light source 161 on the basis of a length of an image output period which is a period in which an image based on image data is outputted. The color separation unit 162 separates the light emitted from the light source 161 into red color (R), green color (G), and blue color (B) and supplies each light to the display elements 151R, 151G, and 151B.

The display elements 151R, 151G, and 151B limit the supplied light of each color to the amount of light reflected by each pixel of each display element. The color combining unit 163 combines each light of red color (R), green color (G), and blue color (B) reflected by the display elements 151R, 151G, and 151B. The projection optical system 171 projects the light combined by the color combining unit 163 onto the screen. The CPU 110 sequentially performs the above projection processing for each image of one frame while projecting an image.

When the operation unit 113 receives an operation instruction to change a display of an image from a user, the CPU 110 transmits the operation instruction to the optical system control unit 170. The optical system control unit 170 controls the projection optical system 171 and causes the projection optical system 171 to change, for example, the focus of an image or a magnification ratio of the optical system.

The CPU 110 determines whether or not the operation unit 113 receives an operation instruction to switch the display mode from the user while performing the projection processing described above (S240). When the operation unit 113 receives the operation instruction to switch the display mode from the user (Yes in S240), the CPU 110 returns to S210 and determines the display mode. The CPU 110 transmits a menu screen to select a display mode to the image processing unit 140 as an OSD (On-Screen Display) image. The image processing unit 140 superimposes the OSD screen on an image that is being displayed. The user can select a display mode while viewing the projected OSD screen.

When the instruction to switch the display mode is not inputted by the user from the operation unit 113 while the projection processing described above is being performed (No in S240), the CPU 110 determines whether or not the operation unit 113 receives an operation instruction to end the projection from the user (S250). When the operation unit 113 receives the operation instruction to end the projection from the user (Yes in S250), the CPU 110 stops the supply of power to each block of the projector 100 and ends the projection of the image.

When the operation unit 113 does not receive the operation instruction to end the projection from the user (No in S250), the CPU 110 returns to S220 and repeats processing from S220 to S250 until the operation unit 113 receives the operation instruction to end the projection from the user.

In this way, the projector 100 of the present embodiment displays an image on the screen.

In the "file reproduction display mode", the CPU 110 causes the recording/reproducing unit 191 to acquire a file list of still image data or video image data and thumbnail data of each file from the recording medium 192 and temporarily store the file list and the thumbnail data in the RAM 112. Then, the CPU 110 generates a character image based on the file list temporarily stored in the RAM 112 or an image based on the thumbnail data of each file temporarily stored in the RAM 112 and transmits the character image or the image to the image processing unit 140. Then, the CPU 110 controls the image processing unit 140, the panel control unit 150, and the light source control unit 160 in the same manner as in the normal projection processing (S230).

On a projection screen, the user can input an instruction to select characters or an image corresponding to the still image data or the video image data, which are stored in the recording medium 192, through the operation unit 113. When the operation unit 113 receives an operation instruction to select still image data or video image data from the user, the CPU 110 transmits an operation instruction to select an image from the user to the recording/reproducing unit 191. The recording/reproducing unit 191 acquires still image data or video image data selected by the user from the recording medium 192. The CPU 110 causes the RAM 112 to temporarily store the still image data or the video image data acquired by the recording/reproducing unit 191. The CPU 110 controls each operation block on the basis of the program stored in the ROM 111 and displays an image included in the still image data or a video included in the video image data.

When the CPU 110 displays, for example, a video of video image data, the CPU 110 sequentially transmits an acquired video of video image data to the image processing unit 140 and controls the image processing unit 140, the panel control unit 150, and the light source control unit 160 in the same manner as in the normal projection processing (S230). Further, when the CPU 110 displays still image data, the CPU 110 transmits an acquired image to the image processing unit 140 and controls the image processing unit 140, the panel control unit 150, and the light source control unit 160 in the same manner as in the normal projection processing (S230).

In the "file reception display mode", the CPU 110 causes the RAM 112 to temporarily store still image data or video image data received by the communication unit 193. The CPU 110 reproduces an image included in the acquired still image data or a video included in the acquired video image data on the basis of the program stored in the ROM 111. When the CPU 110 reproduces, for example, video image data, the CPU 110 sequentially transmits a video of the video image data to the image processing unit 140 and controls the image processing unit 140, the panel control unit 150, and the optical system control unit 170 in the same manner as in the normal projection processing (S230). When the CPU 110 reproduces still image data, the CPU 110 transmits an image to be displayed to the image processing unit 140 and controls the image processing unit 140, the panel control unit 150, and the optical system control unit 170 in the same manner as in the normal projection processing (S230).

Next, a characteristic configuration of the present embodiment will be described with reference to FIG. 3.

Figure 3:
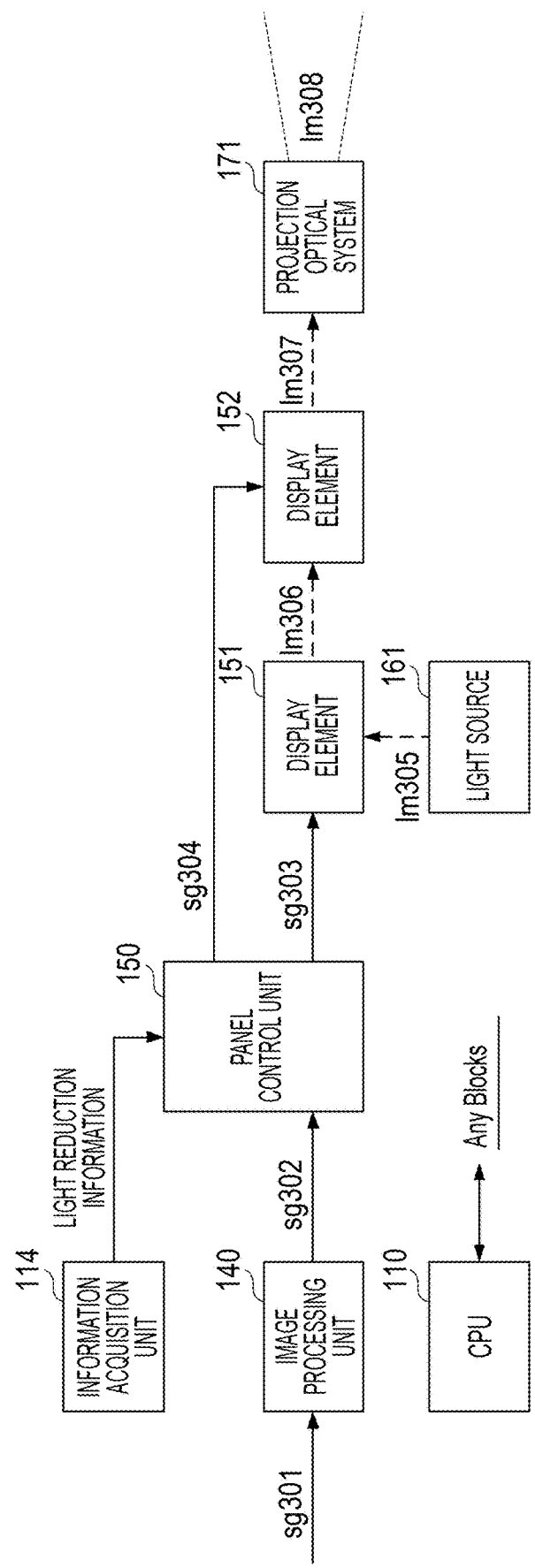
FIG. 3 is a block diagram showing a characteristic configuration of the present disclosure.

FIG. 3 is a block diagram showing a characteristic configuration of the projector 100 of the present embodiment.

Processing performed on the display elements 151R/G/B is the same, so that the display elements 151R/G/B will be described as the display element 151.

The CPU 110 outputs a setting value (parameter) for each processing to the image processing unit 140 and the panel control unit 150. On the other hand, the CPU 110 acquires a current setting value from the image processing unit 140 and the panel control unit 150 as needed.

The information acquisition unit 114 acquires light reduction information related to gradation processing for edge blending from the operation unit 113 or a remote control not shown in the drawings and outputs the light reduction information to the panel control unit 150 on the basis of an instruction of the CPU 110 requested from the operation unit 113 or the remote control not shown in the drawings. The light reduction information includes pixel region information to which the gradation processing will be applied.

The image processing unit 140 performs various image processing on an input video signal sg301 in cooperation with the CPU 110 and outputs a generated image processing signal sg302 to the panel control unit 150. The various image processing includes an IP conversion, a frame rate conversion, a resolution conversion, a γ conversion, a color gamut conversion, a color correction, an edge emphasis, and the like. As described above, the input video signal sg301 is inputted into the image processing unit 140 from the image input unit 130, the recording/reproducing unit 191, the communication unit 193, and the like according to the display mode.

The panel control unit 150 generates a video panel control signal sg303 and an edge blending panel control signal sg304 in cooperation with the CPU 110 and outputs the video panel control signal sg303 and the edge blending panel control signal sg304 to the display element 151 and the display element 152, respectively. The video panel control signal sg303 is generated as a signal for the display element 151 to represent a video by PWM drive on the basis of the image processing signal sg302 inputted into the panel control unit 150 and a PWM drive waveform pattern associated with the image processing signal sg302. The edge blending panel control signal sg304 is generated as a signal to control the display element 152 on the basis of the light reduction information of the gradation processing inputted into the panel control unit 150.

The display element 151 controls a reflection ratio of each pixel on the basis of the inputted video panel control signal sg303 in cooperation with the CPU 110.

The display element 152 controls a transmittance ratio of each pixel on the basis of the inputted edge blending panel control signal sg304 in cooperation with the CPU 110.

Light source light lm305 outputted from the light source 161 passes through the display element 151, so that the light source light lm305 is reflected as first modulation light lm306 according to pixel values of image data where various image processing is applied. Further, this light passes through the display element 152, so that this light is transmitted as second modulation light lm307 where gradation processing is applied according to an edge blending setting. This light passes through the projection optical system 171 such as a lens and is displayed on the screen as projection light lm308.

Next, a characteristic operation of the present embodiment will be described with reference to FIGS. 4 and 15. In the present embodiment, a case will be described where image data is displayed in a drawing region of 3840 vertical pixels×2160 horizontal pixels in the display element 151 and gradation processing is applied with a setting value of a right side width of 200 pixels.

Figure 4:
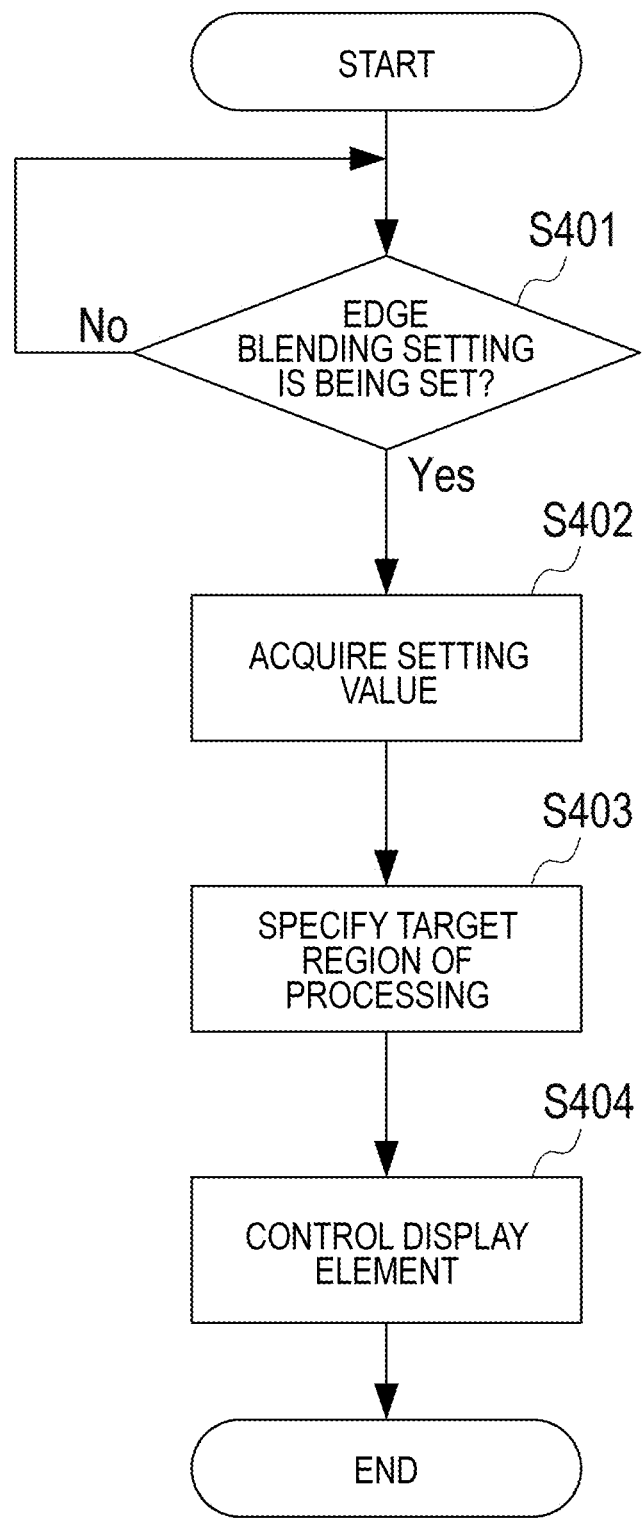
FIG. 4 is a flowchart for explaining a characteristic operation of a first embodiment.

FIG. 4 is a flowchart executed by the CPU 110 of the projector 100 in FIG. 1.

FIGS. 15A to 15D are diagrams schematically showing a relationship between a display state on the display element 151 and the display element 152 and a projection image projected by the projector 100. In FIG. 15A, image data is drawn in a part of the displayable region 841 included in the display element 151 and the drawing region 842 is a region where the image data is drawn in the displayable region 841 of the display element 151. FIG. 15B is a diagram schematically showing a relationship between the drawing corresponding region 843 and the gradation processing region 844 in the display element 152. The drawing corresponding region 843 is a region corresponding to the drawing region 842 of the display element 151 in the display element 152. The gradation processing region 844 is a region where the gradation processing is applied in the display element 152. In FIGS. 15A and 15B, the gradation processing region 844 is coincident with the drawing corresponding region 843, so that the gradation processing is appropriately applied to a region of a projection image on the projection screen as shown in FIG. 15C.

First, in step S401, the CPU 110 determines whether or not the edge blending setting of the projector 100 is valid, and when the edge blending setting is valid, the CPU 110 proceeds to the next step S402.

Next, in step S402, the information acquisition unit 114 receives an instruction from the CPU 110 and thereby acquires a setting value of the edge blending and outputs the setting value to the panel control unit 150. The setting value is a value indicating a region where the gradation processing is to be applied to a video and is region information based on the side and the width of the video. There may be a plurality of regions where the gradation processing is applied. In the present embodiment, the setting value is region information having a width of 200 pixels from the right side.

Next, in step S403, the panel control unit 150 receives an instruction from the CPU 110 and thereby calculates a parameter for performing the gradation processing in the display element 152 and outputs the parameter to the display element 152. In this case, the parameter for performing the gradation processing is calculated on the basis of a relative positional relationship between the information received in step S402 and the drawing corresponding region 843 of the display element 152 with respect to the known drawing region 842 of the display element 151. The parameter calculated in the present embodiment is a parameter indicating the gradation processing region 844 with respect to the drawing corresponding region 843 and is a region corresponding to a region having a width of 200 pixels from the right side of the drawing region 842.

Further, in step S404, the display element 152 receives an instruction from the CPU 110 and thereby performs control so that pixels corresponding to the drawing corresponding region 843 on the display element 152 received in step S403 have a desired transmittance ratio. In other words, as shown in FIG. 15D, in the gradation processing region 844 according to the present embodiment, the pixel value at the right end portion is 0, the pixel value linearly increases from the right end, and the pixel value becomes 15 (maximum value) at the left end portion of the gradation region. Further, all pixel values in a region other than the gradation processing region 844 in the drawing corresponding region 843 are 15, and each pixel has a transmittance ratio corresponding to its pixel value.

Next, a phenomenon that the light source light outputted from the light source 161 is modulated and becomes projection light having a desired luminance in the present embodiment will be described with reference to a time chart in FIG. 5.

Figure 5:
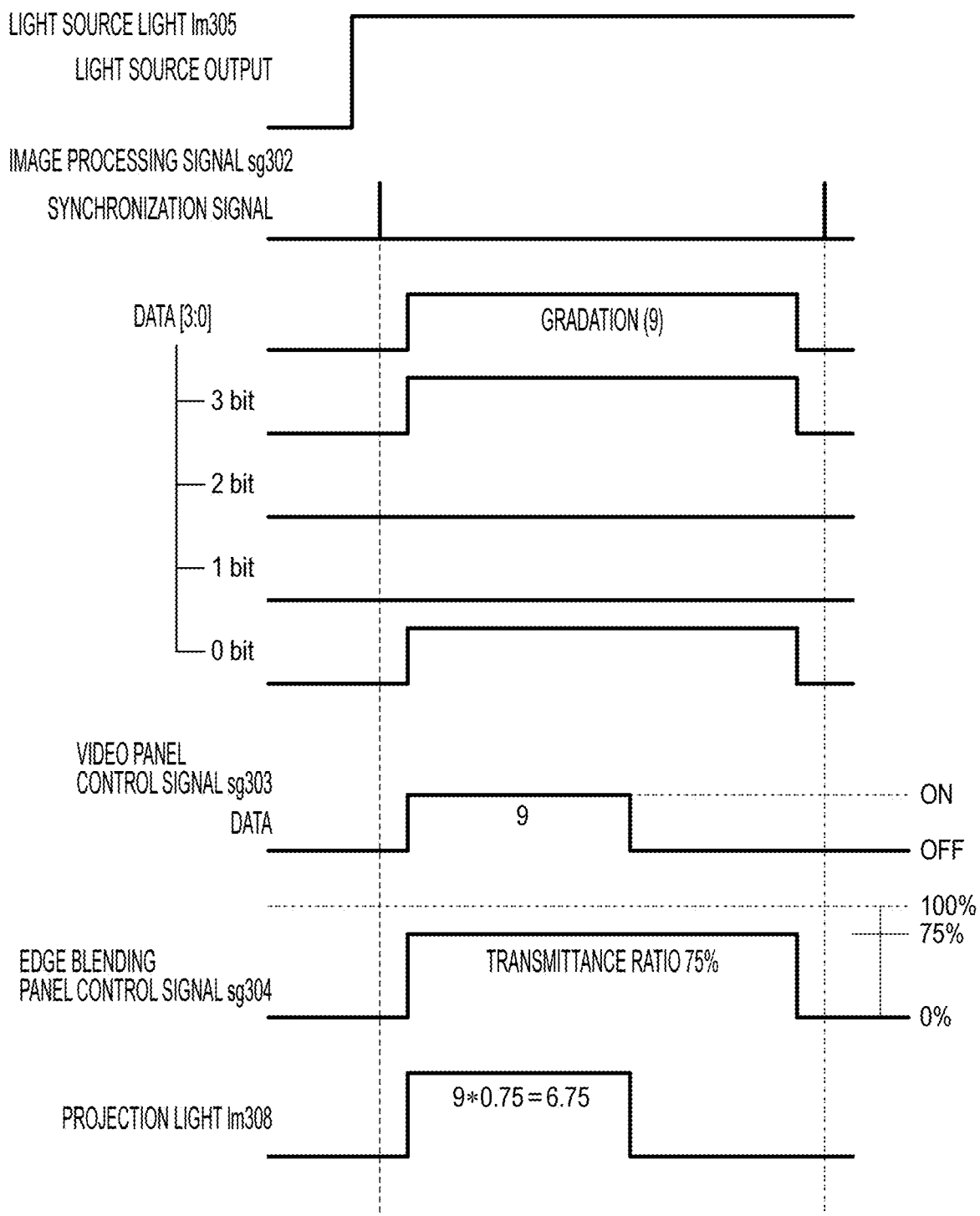
FIG. 5 is a time chart for explaining signal processing to be a feature of the first embodiment.

FIG. 5 is a time chart when light of a pixel having a pixel value of 9 (the maximum pixel value is 15) of the image is reduced to 75% as the gradation processing and projection light of 6.75 (=9*0.75) is outputted.

First, the image processing signal sg302 outputted from the image processing unit 140 is a synchronization signal and a data signal. The data signal of an image is outputted at a timing synchronized with the synchronization signal.

The video panel control signal sg303 outputted from the panel control unit 150 is a PWM signal according to a pixel value 9 indicated by the data signal synchronized with the synchronization signal. Considering a ratio to the maximum pixel value 15, the PWM signal that is ON for 9/15 period of time is generated. Thereby, the display element 151 is controlled so as to output the first modulation light lm306 formed by reflecting the light source light lm305 for 9/15 of a period of time in which one pixel is represented.

A light reduction panel control signal sg304 outputted from the panel control unit 150 is an analog signal that is synchronized with the synchronization signal and has a voltage value of 75% of the maximum value according to light reduction ratio information. Thereby, the display element 152 is controlled so as to output the second modulation light lm307 formed by transmitting 75% of the first modulation light lm306 for the period of time in which one pixel is represented.

Thereby, 75% of the projection light lm308 projected through the projection optical system 171 is projected for 9/15 period of time of the period of time in which one pixel is represented, so that desired output is possible.

(Processing when Correcting Image)

Hereinafter, an operation when correcting a projection image will be described. Specifically, details of operations when performing a movement correction that moves a projection position of a projection image, a registration correction, and a shape correction will be described.

(Movement Correction)

The movement correction is a correction that the projector 100 changes a projection position of a projection screen displayed on a projection surface (screen). The information acquisition unit 114 acquires a movement instruction for moving the projection position of the projection image, so that the projector 100 performs the movement correction. The information acquisition unit 114 acquires the amount of change of a position of image data to be drawn in the display element 151. The information acquisition unit 114 acquires the amount of change of the position on the basis of, for example, an operation inputted into the operation unit 113, a signal from a remote control, or an image captured by a camera.

When the information acquisition unit 114 acquires a movement instruction, the panel control unit 150 controls at least either one of a transmittance ratio or a reflection ratio of pixels corresponding to a position of the projection image that has been moved on the basis of the movement instruction in the display element 151 and the display element 152. Specifically, the CPU 110 specifies a pixel region of the display element 152 corresponding to a drawing position of image data on the display element 151 on the basis of the amount of change of the position acquired by the information acquisition unit 114 and relative position information stored in the ROM 111. The panel control unit 150 specifies pixels corresponding to a position of the projection image that has been moved on the basis of the movement instruction in the display element 152 on the basis of the specified pixel region, and performs gradation processing on the projection image by controlling a transmittance ratio of the specified pixels.

FIGS. 10A to 10I are diagrams for explaining about processing during the movement correction. FIG. 10A is a diagram schematically showing a state where image data is drawn in a part of a displayable region 801 included in the display element 151. In FIG. 10A, a drawing region 802 is a region where image data is drawn in the displayable region 801 of the display element 151.

FIG. 10B is a diagram schematically showing a relationship between a drawing corresponding region 803 and a gradation processing region 804 in the display element 152. The drawing corresponding region 803 is a region corresponding to the drawing region 802 of the display element 151 in the display element 152. The gradation processing region 804 is a region where the gradation processing is applied in the display element 152. In FIG. 10A and FIG. 10B, the gradation processing region 804 is coincident with the drawing corresponding region 803, so that the gradation processing is appropriately applied to a region of the projection image on the projection screen as shown in FIG. 10C.

FIG. 10D is a diagram schematically showing a drawing region 805 where the movement correction has been performed in the display element 151. FIG. 10E is a diagram schematically showing a relationship between a drawing corresponding region 806 in the display element 152 corresponding to the drawing region 805 where the movement correction has been performed in only the display element 151 and a gradation processing region 807. In FIG. 10D and FIG. 10E, the drawing corresponding region 806 is not coincident with the gradation processing region 807, so that as shown in FIG. 10F, the gradation processing is not performed in a region where the gradation processing may be performed in the drawing corresponding region 806. Therefore, the projector 100 changes a target region of the gradation processing in the display element 152 according to the movement correction.

In the same manner as FIG. 10D, FIG. 10G is a diagram schematically showing a drawing region 805 where the movement correction has been performed in the display element 151. FIG. 10H is a diagram showing a state where the panel control unit 150 has moved a position of the gradation processing region in the display element 152. In FIG. 10H, a gradation processing region 808 is coincident with the drawing corresponding region 806. As a result, as shown in FIG. 10I, even when the projection position of the projection image is moved, the panel control unit 150 can suppress occurrence of image quality disturbance by applying the gradation processing by using the display element 152.

(Registration Correction)

The registration correction is processing that corrects misregistration that occurs when the projector 100 displays video by using a plurality of display elements (for example, 151R, 151G, and 151B). The projector 100 acquires an instruction of the registration correction that moves the projection position of the projection image. When the information acquisition unit 114 acquires the instruction of the registration correction, the panel control unit 150 controls at least either one of a transmittance ratio or a reflection ratio of pixels corresponding to a position of the projection image after the registration correction in the display element 151 and the display element 152.

Figure 11A:
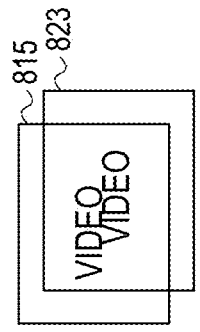
FIGS. 11A to 11F are diagrams for explaining about registration correction.

FIGS. 11A to 11F are diagrams for explaining about the registration correction. FIG. 11A is a diagram schematically showing a state where image data is drawn in a part of a pixel region included in the display element 151R. In FIG. 11A, a display region 811 is a displayable region of the display element 151R and a drawing region 812 is a region where image data is drawn in the displayable region of the display element 151R.

Figure 11B:
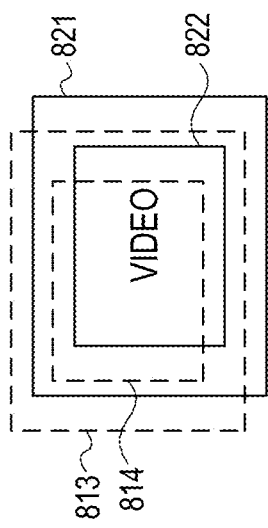

FIG. 11B is a diagram schematically showing a state where image data is drawn in a part of a pixel region included in the display element 151G. In FIG. 11B, a display region 821 is a displayable region of the display element 151G and a drawing region 822 is a region where image data is drawn in the displayable region of the display element 15G. In FIG. 11B, a display region 813 indicated by a dashed line indicates a position of the displayable region of the display element 151R corresponding to a position of the display region 821 of the display element 15G. Further, a drawing region 814 indicated by a dashed line indicates a position of a region, where image data is drawn in the displayable region of the display element 151R, corresponding to a position of the drawing region 822 of the display element 151G. As shown in FIG. 11B, the drawing region 814 is not coincident with the drawing region 822.

Figure 11C:
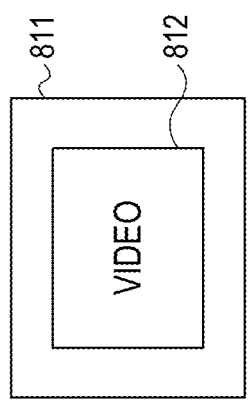

FIG. 11C is a diagram schematically showing a state where the drawing region 812 and the drawing region 822 deviate each other on the projection screen and the misregistration occurs. In FIG. 11C, a projection image 815 is an image formed by projecting the drawing region 812 of the display element 151R onto the projection screen. In FIG. 11C, a projection image 823 is an image formed by projecting the drawing region 822 of the display element 151G onto the projection screen. Such a misregistration occurs, for example, when a fixation deviation of a display element occurs due to aged deterioration of the projector 100.

Figure 11D:
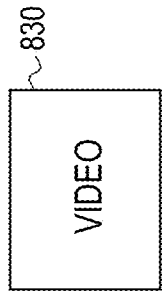
Figure 11E:
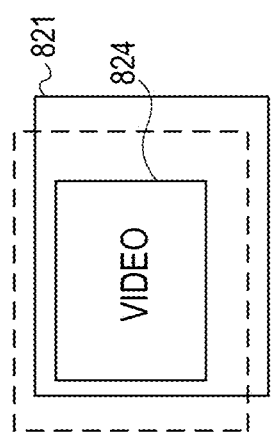
Figure 11F:
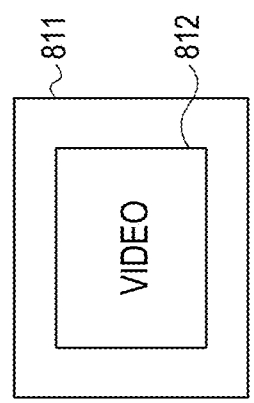

In the same manner as FIG. 11A, FIG. 11D is a diagram schematically showing a state where image data is drawn in a part of a pixel region included in the display element 151R. FIG. 11E is a diagram schematically showing a state where the position of the drawing region 822 in FIG. 11B is corrected to a position of a drawing region 824 by performing the registration correction. In FIG. 11E, the drawing region 812 is coincident with the drawing region 824. By doing so, as shown in FIG. 11F, it is possible to project a projection image 830 where the drawing region 812 of the display element 151R and the drawing region 824 of the display element 151G are superimposed together on the projection screen.

(Shape Correction)

The shape correction is a correction that the projector 100 deforms the projection screen displayed on the projection surface (screen). When the information acquisition unit 114 acquires a deformation instruction for deforming the projection image, the projector 100 performs the shape correction. For example, the information acquisition unit 114 acquires the amount of change of the shape of the image data to be drawn to the display element 151. Specifically, the information acquisition unit 114 may acquire the amount of change of the shape from an operation inputted into the operation unit 113, a signal from a remote control, or an image captured by a camera.

When the information acquisition unit 114 acquires the deformation instruction, the panel control unit 150 controls at least either one of a transmittance ratio or a reflection ratio of pixels corresponding to the shape of the projection image that has been deformed on the basis of the deformation instruction in the display element 151 and the display element 152. Specifically, the CPU 110 specifies a pixel region of the display element 152 corresponding to a drawing position of image data on the display element 151 on the basis of the amount of change of the shape and relative position information between the display element 151 and the display element 152. The panel control unit 150 specifies pixels corresponding to the shape of the projection image that has been deformed on the basis of the deformation instruction in the display element 152 on the basis of the specified pixel region, and performs gradation processing on the projection image by controlling a transmittance ratio of the specified pixels.

FIGS. 12A to 12I are diagrams for explaining about trapezoid correction which is an example of the shape correction. FIG. 12A is a diagram schematically showing a state where image data is drawn in a part of a pixel region included in the display element 151. In FIG. 12A, a display region 831 is a displayable region of the display element 151 and a drawing region 832 is a region where image data is drawn in the displayable region of the display element 151.

FIG. 12B is a diagram schematically showing a relationship between a drawing corresponding region 833 and a gradation processing region 834 in the display element 152. The drawing corresponding region 833 is a region corresponding to the drawing region 832 of the display element 151 in the display element 152. The gradation processing region 834 is a region where the gradation processing is applied in the display element 152. In FIG. 12A and FIG. 12B, the gradation processing region 834 is coincident with the drawing corresponding region 833, so that the gradation processing is appropriately applied to a region of the projection image on the projection screen as shown in FIG. 12C.

However, in FIG. 12C, the projector 100 does not correctly face the projection surface and performs projection with a tilt angle, so that image data drawn in a rectangular shape on the display element 151 is not projected in a rectangular shape on the projection surface. The image processing unit 140 deforms inputted image data into an image of a trapezoidal shape so that the image data is projected in a rectangular shape on the projection surface.

FIG. 12D is a diagram schematically showing a drawing region 835 where the trapezoid correction has been performed in the display element 151. FIG. 12E is a diagram schematically showing a relationship between a drawing corresponding region 836 in the display element 152 corresponding to the drawing region 835 where the trapezoid correction has been performed in only the display element 151 and a gradation processing region 837. In FIG. 12D and FIG. 12E, the drawing corresponding region 836 is not coincident with the gradation processing region 837, so that as shown in FIG. 12F, the gradation processing is not performed in a region where the gradation processing may be performed in the drawing corresponding region 836. Therefore, the projector 100 changes a target region of the gradation processing in the display element 152 according to the trapezoid correction.

In the same manner as FIG. 12D, FIG. 12G is a diagram schematically showing the drawing region 835 where the trapezoid correction has been performed in the display element 151. FIG. 12H is a diagram showing a state where the panel control unit 150 deforms the gradation processing region in the display element 152. In FIG. 12H, a gradation processing region 838 is coincident with the drawing corresponding region 836. As a result, as shown in FIG. 12I, even when the shape of the projection image is deformed, the panel control unit 150 can suppress occurrence of image quality disturbance by applying the gradation processing by using the display element 152.

(Operation Flowchart)

Figure 13:
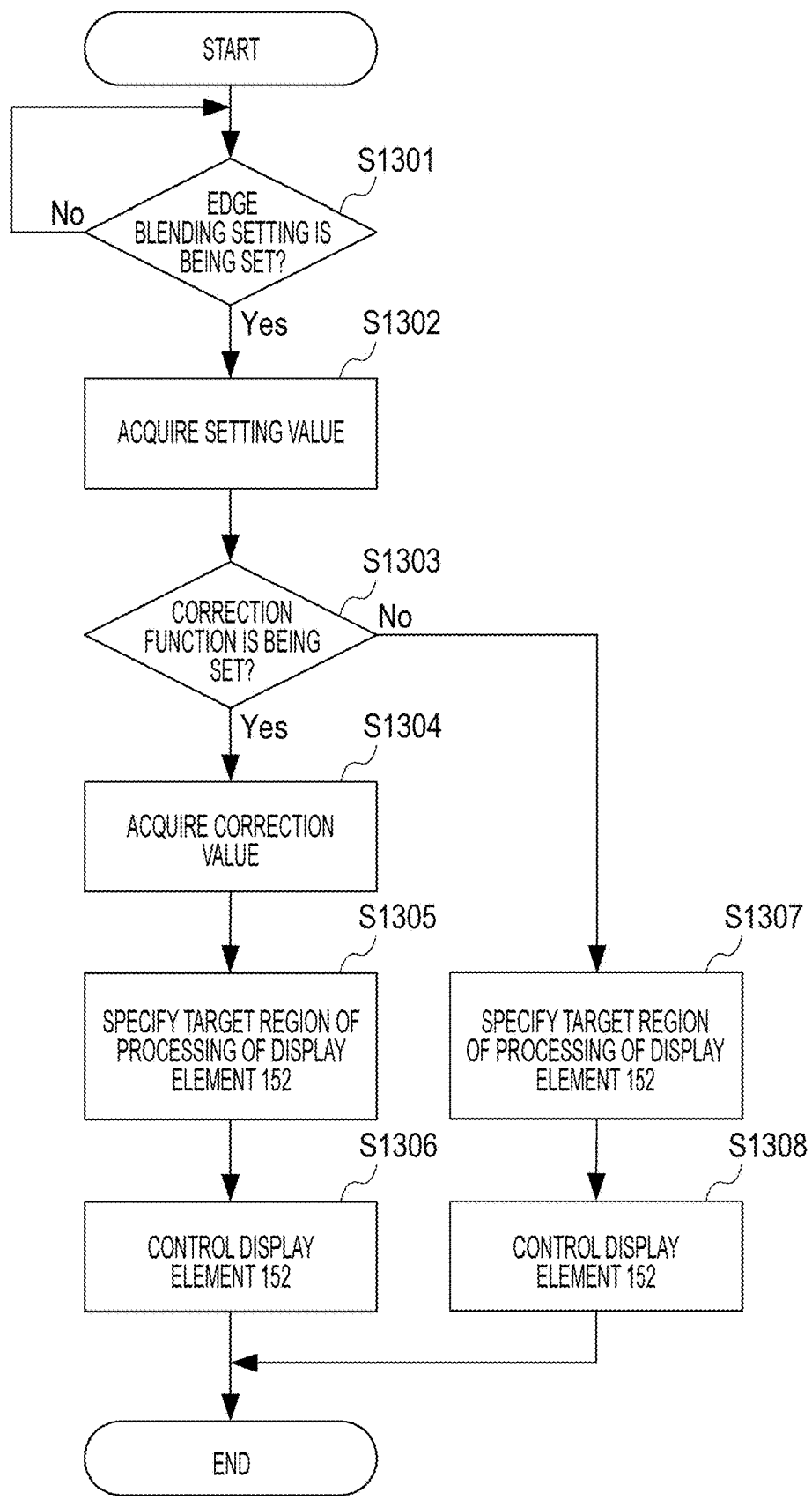
FIG. 13 is an operation flowchart in a case where a projection image is corrected.

FIG. 13 is an operation flowchart in a case where the projection image is corrected.

Step S1301 is the same as step S401 in FIG. 4, so that the description thereof will be omitted. When the panel control unit 150 determines that the information acquisition unit 114 acquires a superposition instruction and the projector 100 is setting the edge blending, the panel control unit 150 proceeds to step S1302. Step S1302 is the same as step S402 in FIG. 4, so that the description thereof will be omitted.

In step S1303, the panel control unit 150 determines whether or not the information acquisition unit 114 acquires a movement instruction or a deformation instruction and is setting a correction function. When the information acquisition unit 114 does not acquire a movement instruction or a deformation instruction and is not setting a correction function, the panel control unit 150 proceeds to step S1307. Step S1307 is the same as step S403 in FIG. 4 and step S1308 is the same as step S404 in FIG. 4, so that the description thereof will be omitted.

When the information acquisition unit 114 acquires a movement instruction or a deformation instruction and is setting a correction function, the panel control unit 150 proceeds to step S1304. In step S1304, when the information acquisition unit 114 acquires the movement instruction, the information acquisition unit 114 acquires the amount of change of a position. When the information acquisition unit 114 acquires the deformation instruction, the information acquisition unit 114 acquires the amount of change of a shape.

In step S1305, the CPU 110 specifies a target region of the gradation processing in the display element 152 on the basis of a luminance setting value, relative position information, and the amount of change of a position or the amount of change of a shape. In step S1306, the panel control unit 150 controls the display element 152 on the basis of the luminance setting value and the target region of the gradation processing.

As described above, the projector 100 changes the target region of the gradation processing in the display element 152 according to change of the pixel region of the image data drawn in the display element 151. By doing so, the projector 100 can appropriately maintain a positional relationship between the projection position of video and the target region of the gradation processing.

As described above, according to the present embodiment, the gradation processing for edge blending is performed on a corresponding region in the display element 152 with respect to the display element 151 that displays an image according to image data. In other words, although video display and gradation processing are conventionally performed in the display element 151, when the gradation processing is performed in the display element 152, the gradation processing can be performed regardless of the pixel values of the image data to be displayed by the display element 151, so that black floating due to the present processing does not occur.

In step S402 of the present embodiment, the CPU 110 acquires the setting value of the edge blending. However, the setting value may be information that is set by a user from the operation unit 113 or a remote control not shown in the drawings or may be information received through the communication unit 193.

In step S403 of the present embodiment, the panel control unit 150 calculates a parameter on the basis of optical relative position information between the display element 151 and the display element 152. However, the panel control unit 150 may receive the optical relative position information from the CPU 110 or the ROM 111.

Further, in the description of the present embodiment, it is assumed that the resolutions, the pixel pitches, and the display element sizes of the display element 151 and the display element 152 are the same. However, the present disclosure is not limited to this, and the resolutions, the pixel pitches, and the display element sizes of the display element 151 and the display element 152 may be different from each other. In this case, a calculation may be performed considering the resolution, the pixel pitch, and the display element size in S403.

In the display element 151 of the above embodiment, a DLP system projector using three DMDs corresponding to each color of RGB for displaying an image is described as an example. However, the present disclosure is not limited to this.

Instead of a so-called three-panel type using three DMDs, a so-called single-plate type may be used which irradiates one DMD with light that is time-divided into three colors by using a color wheel and an image corresponding to each color is displayed on the DMD in a time-division manner. When using a single-plate type display element 151, the display element 151 displays an image corresponding to each color for each image display period of each color displayed in a time-division manner by the color wheel, and the display element 152 applies light reduction processing so as to obtain desired transmittance ratio and reflection ratio.

Alternatively, it is possible to use an LCD (Liquid Crystal Display) system, an LCOS (Liquid crystal on silicon) system, or the like. The same goes for the display element 152. In other words, the present disclosure can be applied regardless of the number of the display elements and the order of the display element 151 for displaying an image and the display element 152 for modulating luminance.

In the embodiment described above, the modulation processing of the light from the light source is first performed in the display element 151 and thereafter performed in the display element 152. However, the present disclosure is not limited to this.

By arranging the display element 152 between the light source 161 and the color separation unit 162 instead of arranging the display element 152 between the color combining unit 163 and the projection optical system 171, the light outputted from the light source 161 may be modulated in the display element 151 after the light is modulated in the display element 152.

Further, in the present disclosure, the display element 152 may be controlled based on not only the light reduction information but also the image data. This will be described with reference to FIGS. 16A to 16F.

FIG. 16A shows that image data drawn in a drawing region 852 in the display element 151 includes a dark portion and a bright portion. FIG. 16B shows that a drawing corresponding region 853 of the display element 152 includes a gradation processing region 854 and a dark portion corresponding region 855 indicating a region corresponding to the dark portion.

FIG. 16D shows pixel values for controlling the display element 152 on the basis of the light reduction information. FIG. 16E shows pixel values for controlling the display element 152 so that the dark potion becomes darker and the other portion becomes brighter on the basis of the dark portion and the bright portion of the image data.

Here, as shown in FIG. 16F, a pixel value based on the light reduction information and the image data is calculated on the basis of FIG. 16D and FIG. 16E. Specifically, the pixel values shown in FIG. 16D and the pixel values shown in FIG. 16E are divided by 15, which is the maximum pixel value, to be normalized, and thereafter the normalized pixel values are multiplied together, and its result is multiplied by 15 again to obtain pixel values of FIG. 16F. By controlling the display element 152 according to the pixel values, control considering both the light reduction information and the image data becomes possible.

It is needless to say that the calculation method of the pixel values for the control considering both the light reduction information and the image data is not limited to a calculation method based on a simple multiplication as described above.

Second Embodiment

In the present embodiment, a projector will be described in the same manner as in the first embodiment.

In the present embodiment, a case will be described where the display element 151 of the projector 100 is a time modulation panel. In the same manner as in the first embodiment, the display element 151 represents gradation in a temporal direction by a PWM pattern by using a digital signal. However, a liquid crystal element is used instead of DMD.

In the case of a liquid crystal element that operates with a PWM drive system, a specific image quality disturbance occurs in a gradation pattern for edge blending.

In the present embodiment, a principle of generation of the image quality disturbance and suppression of the image quality disturbance by the present disclosure will be described.

The configuration and the basic operation of the projector 100 other than the premises described above are the same as those of the first embodiment, so that the description thereof will be omitted.

First, the image quality disturbance generated when the liquid crystal element is controlled by using the PWM drive system will be described with reference to FIGS. 6A and 6B. FIG. 6A schematically shows a PWM pattern when the pixel values in the PWM drive system are 7 and 8. In the PWM pattern in FIG. 6A, time T for determining gradation is divided into four different sub-fields (hereinafter referred to as SF), and light emission and non-light emission of each SF are switched, so that the gradation is represented by a temporal integration. As shown in FIG. 6A, regarding a pixel having a pixel value of 7 and a pixel having a pixel value of 8, when one pixel emits light, the other pixel does not emit light. Even when a difference of pixel values between two adjacent pixels is small, if the two pixels have a relationship as described above, the pixels are affected by a transverse electric field and disclination occurs.

As described above, in the PWM drive system, the longer the time in which light emitting time and non-light emitting time do not overlap with each other between two adjacent pixels, the more the disclination occurs. In other words, in the PWM drive system, the greater the phase difference of light emission/non-light emission between two PWM patterns for driving two adjacent pixels, the more the disclination occurs.

Further, when the edge blending processing is performed on the projection image, the disclination can be easily recognized. For example, as shown in FIG. 6B, when the gradation processing is performed on an upper portion of the projection image, the gradation processing is performed so that the upper side of the projection image becomes darkest in a region where the gradation processing is performed. When such processing is performed, the disclination intermittently occurs in the horizontal direction of the projection image and there may be a high probability that the disclination is recognized as a horizontal stripe.

There are mainly three reasons of the high probability that the disclination may be recognized as a horizontal stripe:

1. An occurrence position of the disclination is fixed to a partial region that is a target of the edge blending processing of the projection screen.

2. When performing multi-projection by arranging projection screens of two liquid crystal projectors, a region to be a target of the edge blending processing in the center of the screen tends to be a region of interest for a user.

3. Even in a projection image such as a white solid image where no disclination is generated by a normal projection different from the multi-projection, disclination occurs in a region to be a target of the edge blending processing.

Here, a phenomenon that the light source light outputted from the light source 161 is modulated and becomes projection light having a desired luminance in the present embodiment will be described with reference to a time chart in FIG. 7.

Figure 7:
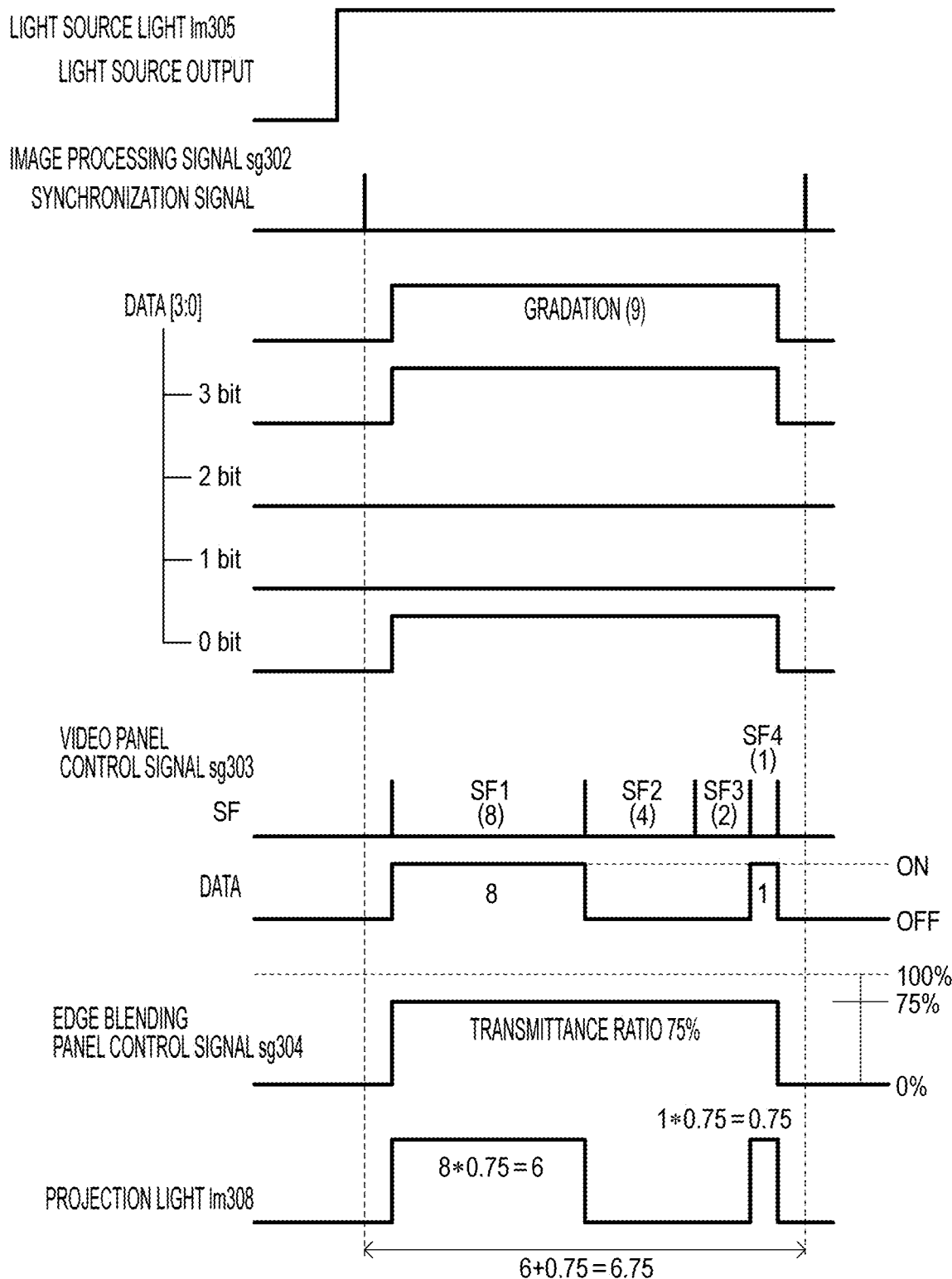
FIG. 7 is a time chart for explaining a signal processing to be a feature of a second embodiment.

FIG. 7 is a time chart when a certain pixel having a pixel value of 9 outputs projection light of 6.75 (=9*0.75) by reducing light to 75% as the gradation processing.

First, the image processing signal sg302 outputted from the image processing unit 140 is a synchronization signal and a data signal. The data signal of an image is outputted at a timing synchronized with the synchronization signal.

The video panel control signal sg303 outputted from the panel control unit 150 is a PWM signal according to a pixel value 9 indicated by the data signal synchronized with the synchronization signal. By combining ON and OFF of SF, the PWM signal that is ON for 9/15 period of time is generated. Thereby, the display element 151 is controlled so as to output the first modulation light lm306 formed by reflecting the light source light lm305 for 9/15 of a period of time in which one pixel is represented.

The light reduction panel control signal sg304 outputted from the panel control unit 150 is an analog signal that is synchronized with the synchronization signal and has a voltage value of 75% of the maximum value according to light reduction ratio information. Thereby, the display element 152 is controlled so as to output the second modulation light lm307 formed by transmitting 75% of the first modulation light lm306 for the period of time in which one pixel is represented.

Thereby, the projection light lm308 projected through the projection optical system 171 is projected at a transmittance ratio of 75% for 9/15 period of time of the period of time in which one pixel is represented, so that desired output is possible.

As described above, in the same manner as in the first embodiment, the gradation processing for edge blending is performed on a corresponding region in the display element 152 with respect to the display element 151 that displays an image according to image data. Thereby, the gradation processing can be performed regardless of pixel values of the image displayed by the display element 151, so that black floating due to the present processing does not occur.

Further, the display element 152 performs the gradation processing, so that the disclination due to the present processing does not occur. This is a characteristic effect of the second embodiment.

Third Embodiment

In the present embodiment, a projector will be described in the same manner as in the first and the second embodiments.

In the present embodiment, a case will be described where the display element 151 of the projector 100 is an amplitude modulation type liquid crystal panel and the display element 152 is a time modulation type DMD.

The configuration and the basic operation of the projector other than the premises described above are the same as those of the first and the second embodiments, so that the description thereof will be omitted.

A phenomenon that the light source light outputted from the light source 161 is modulated and becomes projection light having a desired luminance in the present embodiment will be described with reference to a time chart in FIG. 8.

Figure 8:
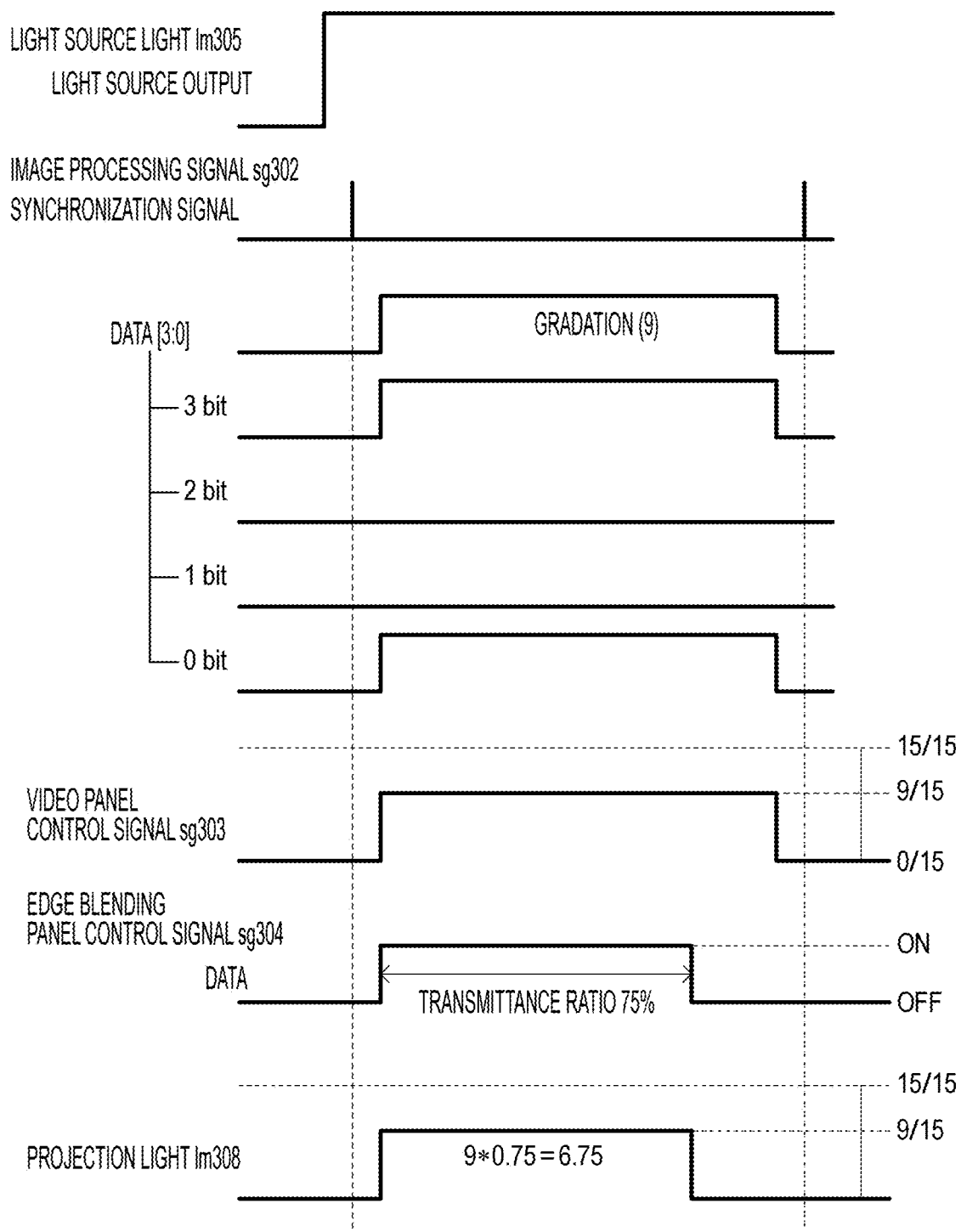
FIG. 8 is a time chart for explaining a signal processing to be a feature of a third embodiment.

FIG. 8 is a time chart when light of a pixel having a pixel value of 9 (the maximum pixel value is 15) of the image is reduced to 75% as the gradation processing and projection light of 6.75 (=9*0.75) is outputted.

First, the image processing signal sg302 outputted from the image processing unit 140 is a synchronization signal and a data signal. The data signal of an image is outputted at a timing synchronized with the synchronization signal.

The video panel control signal sg303 outputted from the panel control unit 150 is an analog signal having a voltage value reduced to 9/15 according to a pixel value 9 indicated by the data signal synchronized with the synchronization signal. Thereby, the display element 151 is controlled so as to output the first modulation light lm306 formed by transmitting 9/15 of the light source light lm305 for a period of time in which one pixel is represented.

The light reduction panel control signal sg304 outputted from the panel control unit 150 is a PWM signal which is synchronized with the synchronization signal and whose ON period is 75% according to light reduction ratio information. Thereby, the display element 152 is controlled so as to output the second modulation light lm307 formed by reflecting the first modulation light lm306 for 75% of a period of time in which one pixel is represented.

Thereby, the projection light lm308 projected through the projection optical system 171 is projected at a transmittance ratio of 9/15 for 75% of the period of time in which one pixel is represented, so that desired output is possible.

As described above, in the same manner as in the first and the second embodiments, the gradation processing for edge blending is performed on a corresponding region in the display element 152 with respect to the display element 151 that displays an image according to image data. Thereby, the gradation processing can be performed regardless of the pixel values of the image data to be displayed by the display element 151, so that black floating due to the present processing does not occur.

Fourth Embodiment

In the present embodiment, a projector will be described in the same manner as in the first to the third embodiments.

In the present embodiment, a case will be described where both the display elements 151 and 152 of the projector 100 are an amplitude modulation type liquid crystal panel.

The configuration and the basic operation of the projector other than the premises described above are the same as those of the first to the third embodiments, so that the description thereof will be omitted.

A phenomenon that the light source light outputted from the light source 161 is modulated and becomes projection light having a desired luminance in the present embodiment will be described with reference to a time chart in FIG. 9.

Figure 9:
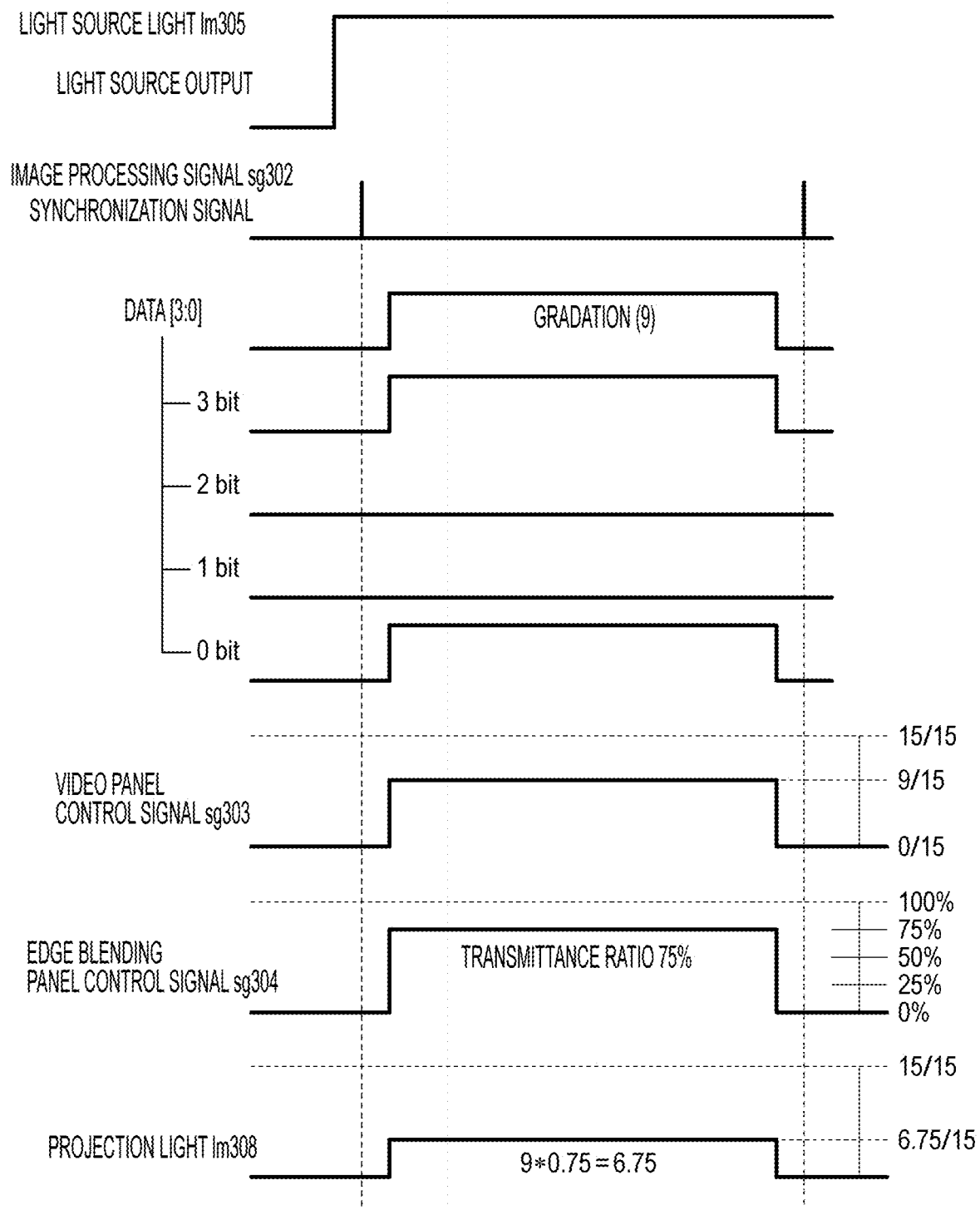
FIG. 9 is a time chart for explaining a signal processing to be a feature of a fourth embodiment.

FIG. 9 is a time chart when light of a pixel having a pixel value of 9 (the maximum pixel value is 15) of the image is reduced to 75% as the gradation processing and projection light of 6.75 (=9*0.75) is outputted.

First, the image processing signal sg302 outputted from the image processing unit 140 is a synchronization signal and a data signal. The data signal of an image is outputted at a timing synchronized with the synchronization signal.

The video panel control signal sg303 outputted from the panel control unit 150 is an analog signal having a voltage value reduced to 9/15 according to a pixel value 9 indicated by the data signal synchronized with the synchronization signal. Thereby, the display element 151 is controlled so as to output the first modulation light lm306 formed by transmitting 9/15 of the light source light lm305 for a period of time in which one pixel is represented.

The light reduction panel control signal sg304 outputted from the panel control unit 150 is an analog signal that is synchronized with the synchronization signal and has a voltage value of 75% of the maximum value according to light reduction ratio information. Thereby, the display element 152 is controlled so as to output the second modulation light lm307 formed by transmitting 75% of the first modulation light lm306 for the period of time in which one pixel is represented.

Thereby, the projection light lm308 projected through the projection optical system 171 is projected at a transmittance ratio of 75% at a transmittance ratio of 9/15 for the period of time in which one pixel is represented, so that desired output is possible.

As described above, in the same manner as in the first to the third embodiments, the gradation processing for edge blending is performed on a corresponding region in the display element 152 with respect to the display element 151 that displays an image according to image data. Thereby, the gradation processing can be performed regardless of pixel values of the image displayed by the display element 151, so that black floating due to the present processing does not occur.

Fifth Embodiment

In the projector 100 according to the first to the fourth embodiments, the panel control unit 150 performs the gradation processing on the projection image by controlling the display element 152 regardless of the presence or absence of occurrence of image quality disturbance. The projector 100 according to the fifth embodiment changes the display element where the gradation processing is performed according to how much a user recognizes image quality disturbance in the projection image. Hereinafter, points different from the first embodiment will be described and the same points will be appropriately omitted.

The CPU 110 estimates the amount of image quality disturbance on the basis of a pattern of a digital signal. The amount of image quality disturbance corresponds to the magnitude of influence of black floating in an overlap region and a non-overlap region in the projection image and is a value corresponding to how much a user recognizes image quality disturbance. For example, the CPU 110 specifies the amount of image quality disturbance when the gradation processing is performed in the display element 151 on the basis of the input video signal sg301 and the luminance setting value.

The panel control unit 150 determines whether to adjust the luminance of the projection image by controlling the display element 151 or adjust the luminance of the projection image by controlling the display element 152 on the basis of pixel values of an overlap region of the input video signal sg301. For example, an average value of the pixel values of the overlap region of the input video signal sg301 is smaller than or equal to a predetermined value, the panel control unit 150 controls the display element 152. The predetermined value may be appropriately determined by experiment or the like performed by a business operator who manufactures the projector 100. The predetermined value is, for example, a value where a user can visually recognize the black floating.

The panel control unit 150 determines whether or not the specified amount of image quality disturbance is greater than or equal to a predetermined value. When the specified amount of image quality disturbance is greater than or equal to the predetermined value, the panel control unit 150 controls the display element 152. When the specified amount of image quality disturbance is smaller than the predetermined value, the panel control unit 150 controls the display element 151.

When the panel control unit 150 adjusts the luminance of the projection image by controlling the display element 151, the panel control unit 150 may perform control so that the display element 152 becomes a total transmission state (or a total reflection state). For example, when the panel control unit 150 determines to perform the gradation processing on the projection image by controlling the display element 151, the panel control unit 150 generates a signal for controlling the display element 152 so that the display element 152 transmits all irradiated light.

Figure 14:
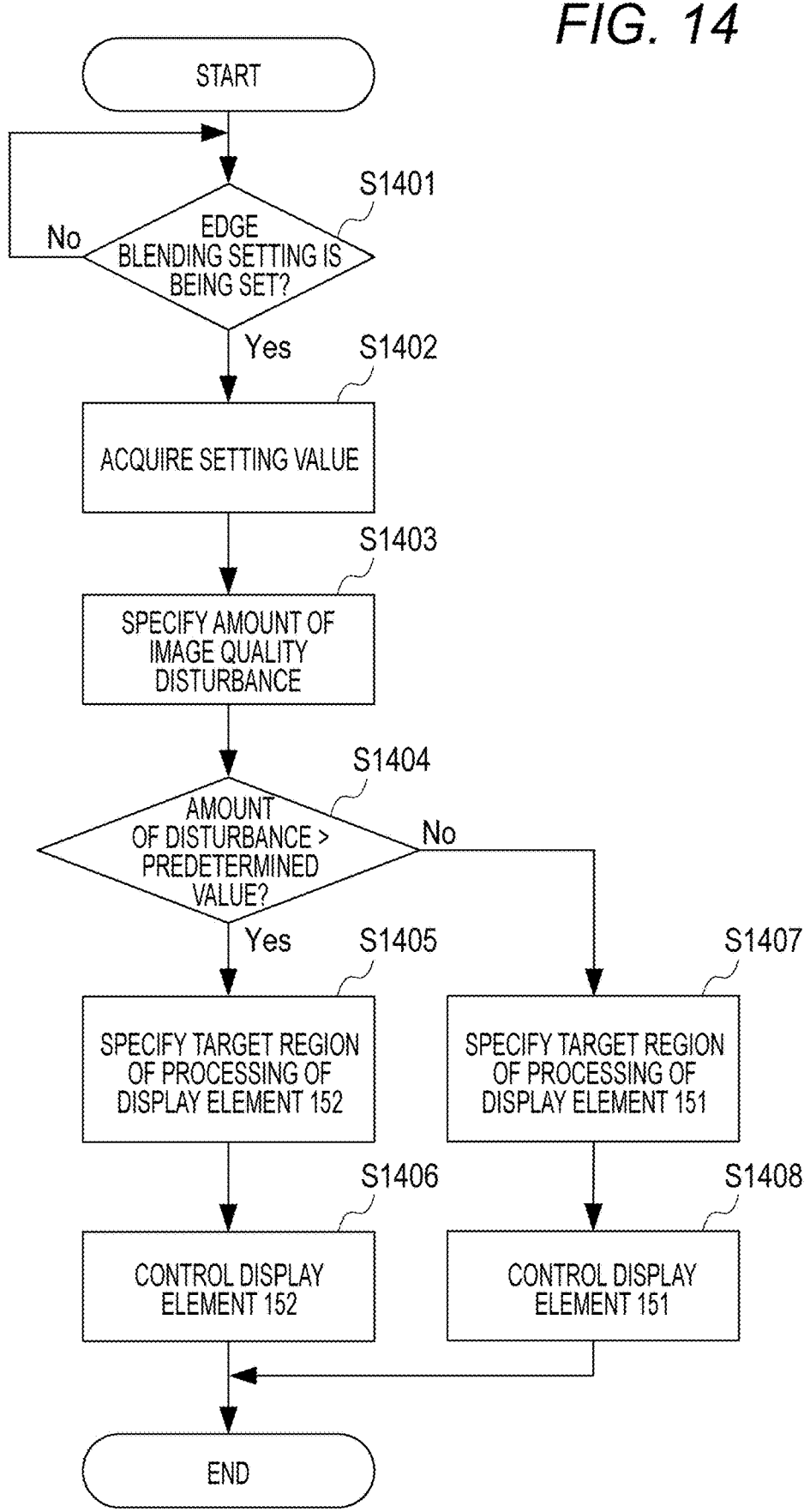
FIG. 14 is a flowchart of processing based on an amount of image quality disturbance.

FIG. 14 is a flowchart of processing based on the amount of image quality disturbance. A flow of processing where the projector 100 changes the display element on which the gradation processing is performed on the basis of the amount of image quality disturbance will be described with reference to FIG. 14.

Step S1401 is the same as step S401 in FIG. 4 and step S1402 is the same as step S402 in FIG. 4, so that the description thereof will be omitted. In step S1403, the CPU 110 specifies the amount of image quality disturbance. In step S1404, the panel control unit 150 determines whether or not the amount of image quality disturbance is greater than or equal to a predetermined value. When the panel control unit 150 determines that the amount of image quality disturbance is greater than or equal to the predetermined value, the panel control unit 150 proceeds to step S1405, and when the panel control unit 150 determines that the amount of image quality disturbance is smaller than the predetermined value, the panel control unit 150 proceeds to step S1407.

Step S1405 is the same as step S403 and step S1406 is the same as step S404, so that the description thereof will be omitted. In step S1407, the image processing unit 140 performs the gradation processing on the input video signal sg301. In step S1408, the panel control unit 150 controls the display element 151 on the basis of the video panel control signal sg303 on which the gradation processing is performed. Further, the panel control unit 150 controls the display element 152 so as to be a total transmission state (or a total reflection state).

As described above, the panel control unit 150 changes the display element where the gradation processing is performed according to how much a user recognizes the image quality disturbance in the projection image. Specifically, when there is a low possibility that the user recognizes the image quality disturbance, the panel control unit 150 performs the gradation processing by using the display element 151, and when there is a high possibility that the user recognizes the image quality disturbance, the panel control unit 150 performs the gradation processing by using the display element 152. By doing so, for example, when the resolution of the display element 151 is higher than resolution of the display element 152, in a state where there is a low possibility that the user recognizes the image quality disturbance, the gradation processing can be performed at high resolution, so that the image quality of the overlap region is improved.

Sixth Embodiment

In the present embodiment, a projector will be described in the same manner as in the first to the fourth embodiments.

In the present embodiment, a case will be described where each of the display elements 151 and 152 of the projector 100 uses one time modulation type DMD.

Figure 17:
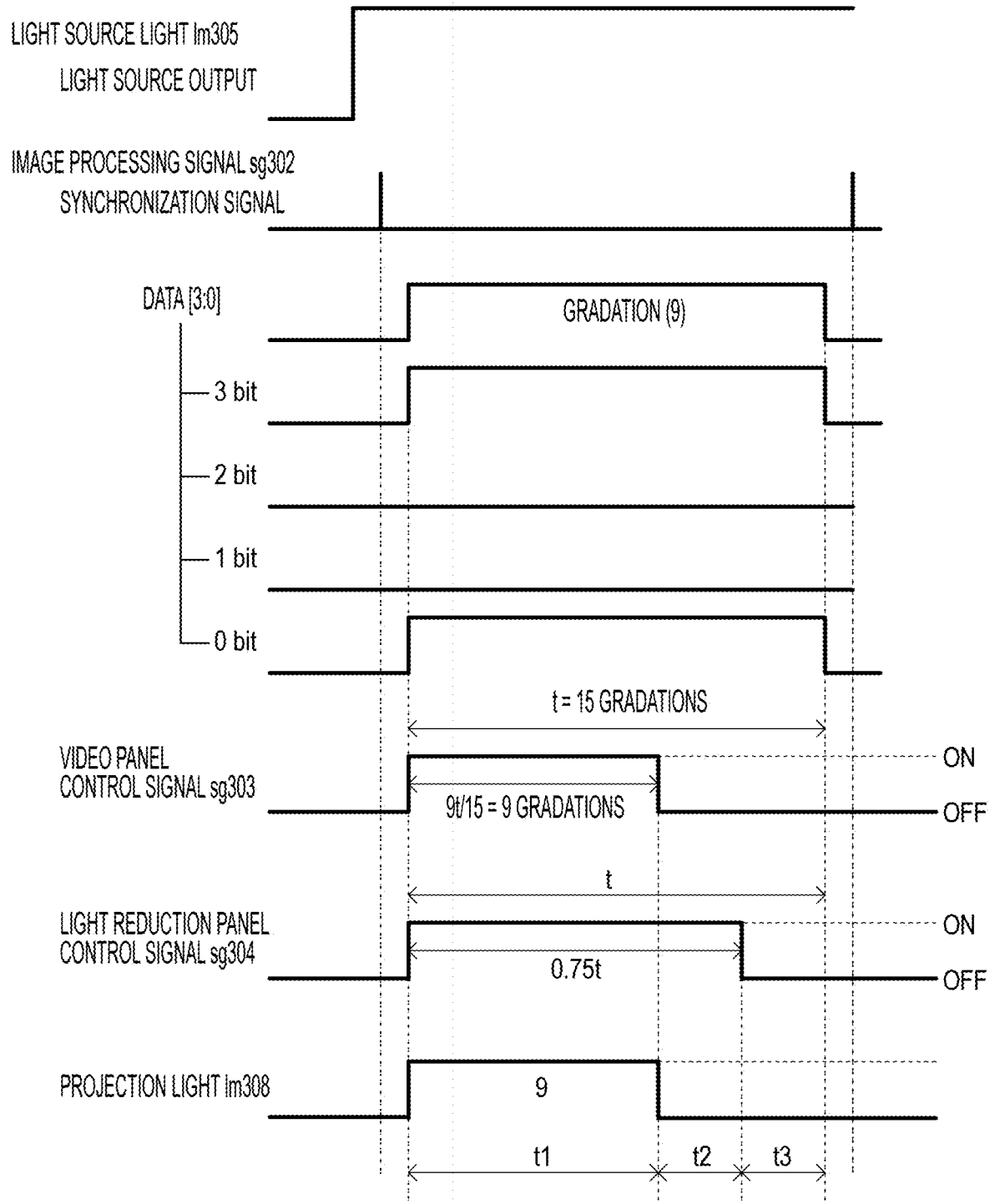
FIG. 17 is a time chart for explaining a signal processing to be a problem of a sixth embodiment.
Figure 18:
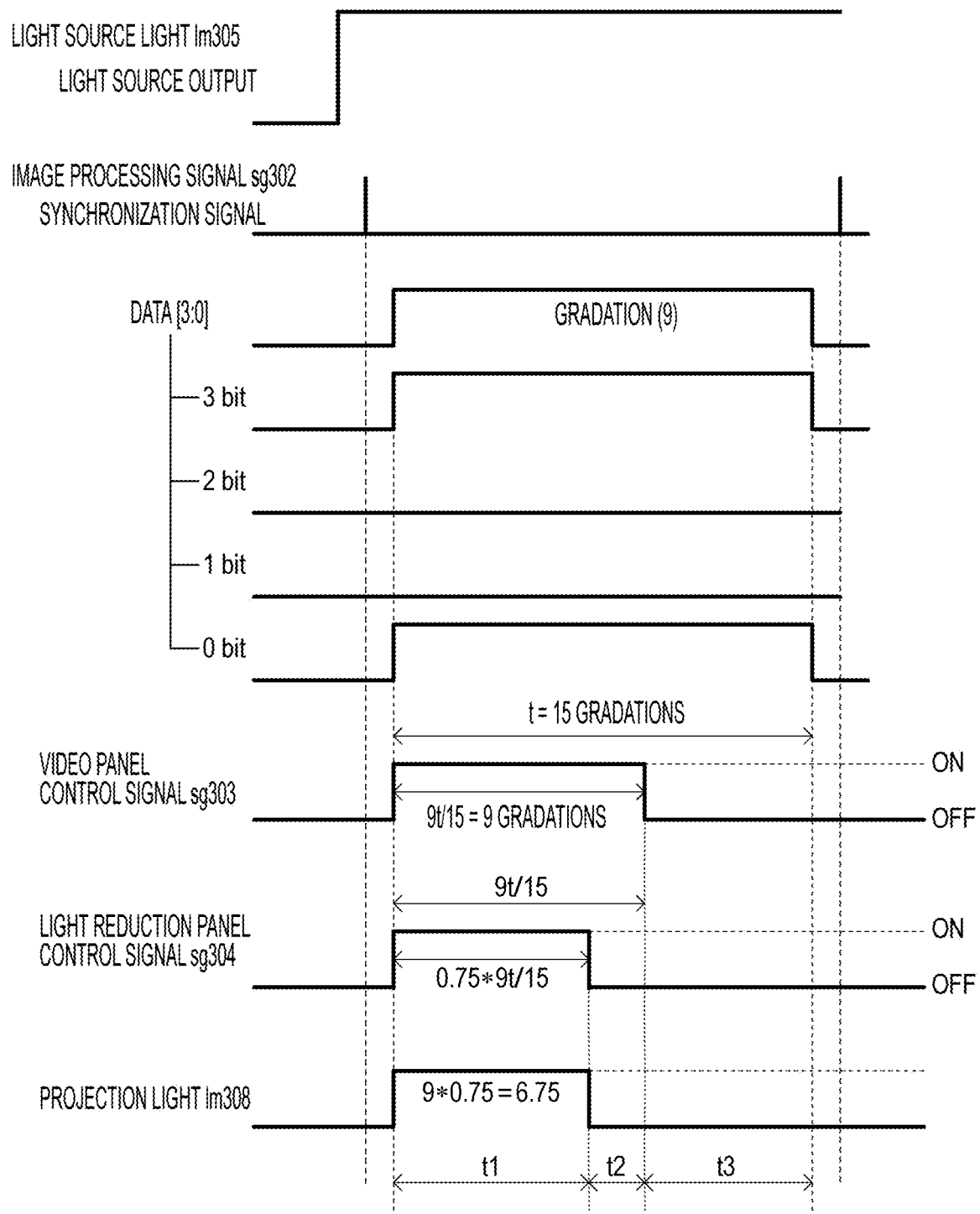
FIG. 18 is a time chart for explaining a signal processing to be a feature of the sixth embodiment.

In a configuration of the present embodiment, a particular problem occurs which the first to the fourth embodiment do not have, so that the problem of the present embodiment and its solution method will be described with reference to FIGS. 17 and 18. FIGS. 17 and 18 show a state of the light source light from when the light is outputted from the light source 161 to when the light is modulated and outputted as projection light in the present embodiment.

The configuration and the basic operation of the projector other than the premises described above are the same as those of the first to the fourth embodiments, so that the description thereof will be omitted.

First, a phenomenon that in the present embodiment, when the methods of the first to the fourth embodiments are performed, even if the light source light outputted from the light source 161 is modulated, the light does not become projection light having a desired luminance will be described with reference to a time chart in FIG. 17.

FIG. 17 is a time chart when light of a pixel having a pixel value of 9 (the maximum pixel value is 15) of the image is reduced to 75% as the gradation processing and projection light of 6.75 (=9*0.75) is outputted.

First, the image processing signal sg302 outputted from the image processing unit 140 is a synchronization signal and a data signal. The data signal of an image is outputted at a timing synchronized with the synchronization signal.

The video panel control signal sg303 outputted from the panel control unit 150 is a PWM signal according to a pixel value 9 indicated by the data signal synchronized with the synchronization signal. Considering a ratio to the maximum pixel value 15, the PWM signal that is ON for 9/15 period of time is generated. Thereby, the display element 151 is controlled so as to output the first modulation light lm306 formed by reflecting the light source light lm305 for 9t/15 of a period of time t in which one pixel is represented.

The light reduction panel control signal sg304 outputted from the panel control unit 150 is a PWM signal which is synchronized with the synchronization signal and whose ON period is 75% according to light reduction ratio information. Thereby, the display element 152 is controlled so as to output the second modulation light lm307 formed by reflecting the first modulation light lm306 for 0.75t (75%) of the period of time t in which one pixel is represented.

Therefore, the projection light lm308 projected through the projection optical system 171 is reflected for a period of time t1 in which both the video panel control signal sg303 and the light reduction panel control signal sg304 are in an ON period. The light is not reflected in a period of time t2+t3 in which either of the video panel control signal sg303 or the light reduction panel control signal sg304 is in an OFF period. As a result, the projected projection light lm308 is projected for 9t/15 of the period of time t in which one pixel is represented. In other words, reflected light of the period of time t1 (9t/15) corresponding to 9 gradations, which is reflected by the display element 151, is entirely reflected by the PWM signal of the display element 152, so that no light reduction processing is applied and projection light corresponding to the 9 gradations is outputted.

Here, a method of modulating the light source light outputted from the light source 161 and reducing the light to projection light having a desired luminance in the present embodiment will be described with reference to a flowchart of FIG. 18.

In the same manner as FIG. 17, FIG. 18 is a time chart when a certain pixel having a pixel value of 9 outputs projection light of 6.75 (=9*0.75) by reducing light to 75% as the gradation processing.

First, the image processing signal sg302 outputted from the image processing unit 140 is a synchronization signal and a data signal. The data signal of an image is outputted at a timing synchronized with the synchronization signal.

The video panel control signal sg303 outputted from the panel control unit 150 is a PWM signal according to a pixel value 9 indicated by the data signal synchronized with the synchronization signal. Considering a ratio to the maximum pixel value 15, the PWM signal that is ON for 9/15 period of time is generated. Thereby, the display element 151 is controlled so as to output the first modulation light lm306 formed by reflecting the light source light lm305 for 9t/15 of a period of time t in which one pixel is represented.

The light reduction panel control signal sg304 outputted from the panel control unit 150 is a PWM signal which is synchronized with the synchronization signal and corresponds to light reduction ratio information acquired from the information acquisition unit 114 and the video panel control signal sg303. In other words, the light reduction panel control signal sg304 is a PWM signal that is ON for 75% of a period of time 9t/15 which is an ON period of the video panel control signal sg303. Thereby, the display element 152 is controlled so as to output the second modulation light lm307 which is reflected for 75% of a period of time 9t/15, which is an ON period of the first modulation light lm306, of the period of time t in which one pixel is represented.

Therefore, the projection light lm308 projected through the projection optical system 171 is reflected for a period of time t1 in which both the video panel control signal sg303 and the light reduction panel control signal sg304 are in an ON period. The light is not reflected in a period of time t2+t3 in which either of the video panel control signal sg303 or the light reduction panel control signal sg304 is in an OFF period. As a result, the projected projection light lm308 is projected for 75% of 9t/15 (6.75t/15) of the period of time t in which one pixel is represented, so that desired output is possible.

As described above, in the projector 100 of the present embodiment, the gradation processing for edge blending is performed on a corresponding region in the display element 152 with respect to the display element 151 that displays an image according to image data. At this time, the display element 152 reflects light for a period of time according to a desired light reduction ratio on the basis of a period of time in which the display element 151 reflects light. Thereby, in the same manner as in the first to the fourth embodiments, the gradation processing can be performed regardless of the pixel values of the image data to be displayed by the display element 151, so that black floating due to the present processing does not occur.

Seventh Embodiment

In the present embodiment, in the same manner as in the sixth embodiment, a case will be described where each of the display elements 151 and 152 of the projector 100 uses one time modulation type DMD.

In the present embodiment, a case where the problem described in the sixth embodiment is solved by a method different from the solution method described in the sixth embodiment will be described with reference to FIG. 19. FIG. 19 shows a state of the light source light from when the light is outputted from the light source 161 to when the light is modulated and outputted as projection light in the present embodiment.

The configuration and the basic operation of the projector other than the premises described above are the same as those of the sixth embodiment, so that the description thereof will be omitted.

A method of modulating the light source light outputted from the light source 161 and reducing the light to projection light having a desired luminance in the present embodiment will be described with reference to a flowchart of FIG. 19.

FIG. 19 is a time chart when a certain pixel having a pixel value of 9 outputs projection light of 6.75 (=9*0.75) by reducing light to 75% as the gradation processing.

First, the image processing signal sg302 outputted from the image processing unit 140 is a synchronization signal and a data signal. The data signal of an image is outputted at a timing synchronized with the synchronization signal.

The video panel control signal sg303 outputted from the panel control unit 150 is a PWM signal according to a pixel value 9 indicated by the data signal synchronized with the synchronization signal. Considering a ratio to the maximum pixel value 15, the PWM signal that is ON for 9/15 period of time is generated. Thereby, the display element 151 is controlled so as to output the first modulation light lm306 formed by reflecting the light source light lm305 for 9t/15 of a period of time t in which one pixel is represented.

The light reduction panel control signal sg304 outputted from the panel control unit 150 is controlled so as to output the second modulation light lm307 which is synchronized with the synchronization signal and toggled in a cycle of time t/15 corresponding to one gradation level. At this time, a duty ratio of a signal to be toggled is controlled so that ON-time is 75% and OFF-time is 25% according to the light reduction ratio information. Thereby, the display element 152 is controlled so as to output the second modulation light lm307 which is reflected for 75% of a period of time 9t/15 (=t1) that is an ON period of the first modulation light lm306 and is not reflected for the other period of time t2 of a period of time t in which one pixel is represented.

Thereby, the projection light lm308 projected through the projection optical system 171 is projected for 75% of 9t/15 (6.75t/15) of the period of time t in which one pixel is represented, so that desired output is possible.

As described above, in the projector 100 of the present embodiment, the gradation processing for edge blending is performed on a corresponding region in the display element 152 with respect to the display element 151 that displays an image according to image data. At this time, the display element 152 reflects light by a toggle signal having a duty ratio according to a desired light reduction ratio for a period of time for representing one gradation level. Thereby, in the same manner as in the sixth embodiment, the gradation processing can be performed regardless of the pixel values of the image data to be displayed by the display element 151, so that black floating due to the present processing does not occur.

Eighth Embodiment

In the present embodiment, in the same manner as in the sixth embodiment, a case will be described where both the display elements 151 and 152 of the projector 100 are a time modulation type DMD.

Figure 23:
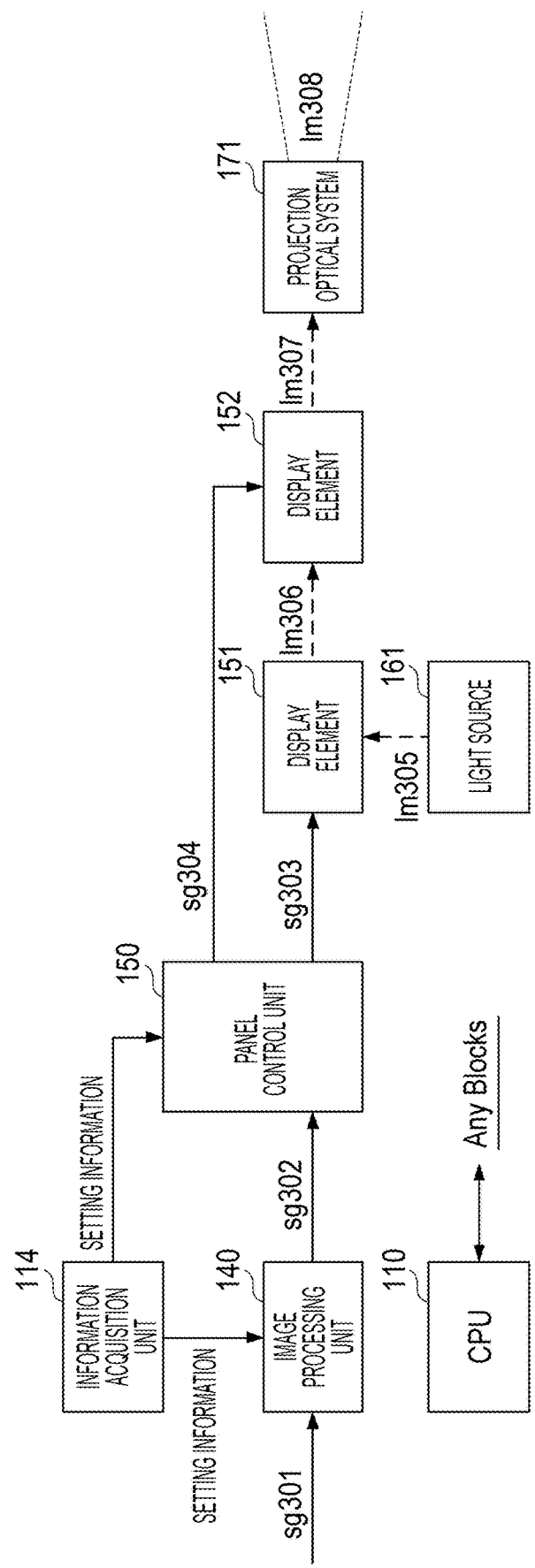
FIG. 23 is a block diagram showing a configuration to be a feature of the eighth embodiment.

In the present embodiment, a problem in a configuration in which a plurality of pixels of the display element 151 correspond to one pixel of the display element 152 and its solution method will be described with reference to FIGS. 20A, 20B, and 23. FIGS. 20A and 20B show a state of the light source light from when the light is outputted from the light source 161 to when the light is modulated and outputted as projection light in the present embodiment. FIG. 23 shows a configuration of a characteristic projector 100.

The configuration and the basic operation of the projector other than the premises described above are the same as those of the sixth embodiment, so that the description thereof will be omitted.

First, in the present embodiment, a problem will be described in a case where the display element 151 is configured by a DMD corresponding to three colors R/G/B (so-called three-panel type) as a configuration in which a plurality of pixels of the display element 151 correspond to one pixel of the display element 152. Video panel control signals sg303R/G/B for controlling display elements 151R/G/B respectively are outputted from the panel control unit 150. Further, three color first modulation lights lm306 reflected by the display elements 151R/G/B are reflected by the display element 152 and then output projection lights lm308R/G/B.

FIG. 20A is a time chart when light of a pixel having pixel values of R=576, G=320, and B=128 (the maximum pixel value is 1023) of the image is reduced to 75% as the gradation processing and projection lights of R=432, G=320, and B=128 are outputted.

Image processing signals sg302R/G/B outputted from the image processing unit 140 are synchronization signals and data signals. The data signal of an image is outputted at a timing synchronized with the synchronization signal.

The video panel control signals sg303R/G/B outputted from the panel control unit 150 are PWM signals according to pixel values 576 (R), 320 (G), and 128 (B) indicated by the three color data signals synchronized with the synchronization signals. Considering ratios to the maximum pixel value 1023, the PWM signals that are ON for 576/1023 (R) period of time, 320/1023 (G) period of time, and 128/1023 (B) period of time, respectively, are generated. Thereby, the display element 151R, the display element 151G, and the display element 151B are controlled so as to output the first modulation light lm306 formed by reflecting the light source light lm305 for 576t/1023, 320t/1023, and 128t/1023, respectively of a period of time t in which one pixel is represented.

The light reduction panel control signal sg304 outputted from the panel control unit 150 is a PWM signal which is synchronized with the synchronization signal and corresponds to the light reduction ratio information acquired from the information acquisition unit 114 and the ON period of the video panel control signal sg303 as described in the sixth embodiment. In this case, the ON periods of the video panel control signals sg303R/G/B are different from each other, so that the ON period of the PWM signal of the maximum gradation is used as a reference. Specifically, a PWM signal that is ON for 75% of a period of time 576t/1023 which is the ON period of the video panel control signal sg303R is used. Thereby, the display element 152 is controlled so as to output the second modulation light lm307 which is reflected for 75% of a period of time 576t/1023, which is an ON period of a first modulation light lm306R, of the period of time t in which one pixel is represented.

Therefore, the projection light lm308 projected through the projection optical system 171 is reflected for a period of time in which both the video panel control signal sg303 and the light reduction panel control signal sg304 are in an ON period. The light is not reflected in a period of time in which either of the video panel control signal sg303 or the light reduction panel control signal sg304 is in an OFF period. As a result, the projected projection light lm308R is projected for 75% of 576t/1023 (432t/1023) of the period of time t in which one pixel is represented, so that desired output is possible. On the other hand, the projected projection lights lm308G/B are projected for 320t/1023 and 128t/1023 (without change) of the period of time t in which one pixel is represented, and no light reduction processing is applied to the projection lights lm308G/B.

Therefore, in the colors other than the color (R) which has the maximum gradation and is used as a reference, desired color balance is lost before and after the light reduction processing.

Here, a method of modulating the light source light outputted from the light source 161 and reducing deviation of light reduction processing of the projection lights other than projection light of color of the maximum gradation will be described with reference to FIGS. 20B and 23.

In the same manner as FIG. 20A, FIG. 20B is a time chart when light of a pixel having pixel values of R=576, G=320, and B=128 (the maximum pixel value is 1023) of the image is reduced to 75% as the gradation processing and projection light is outputted. Different from FIG. 20A, projection lights of R=432, G=280, and B=96 are outputted in FIG. 20B. In FIG. 23, as setting information, light reduction ratio information associated with light reduction processing of edge blending is transmitted from the information acquisition unit 114 to the image processing unit 140.

First, the image processing unit 140 acquires the light reduction ratio information from the information acquisition unit 114. The image processing unit 140 performs image processing on pixel values of colors other than the color of the maximum gradation on the basis of the light reduction ratio information. In this case, a conversion of G=320*0.75=280 and B=128*0.75=96 is performed. Then, the image processing unit 140 outputs a synchronization signal and a data signal after the image processing as image processing signals sg302R/G/B.

The video panel control signals sg303R/G/B outputted from the panel control unit 150 are PWM signals according to pixel values 576 (R), 280 (G), and 96 (B) on the basis of the image processing signal sg302. Considering ratios to the maximum pixel value 1023, the PWM signals that are ON for 576/1023 (R) period of time, 280/1023 (G) period of time, and 96/1023 (B) period of time, respectively, are generated. Thereby, the display element 151R, the display element 151G, and the display element 151B are controlled so as to output the first modulation light lm306 formed by reflecting the light source light lm305 for 576t/1023, 280t/1023, and 96t/1023, respectively of a period of time t in which one pixel is represented.

Further, in the same manner as in the problem described above, the light reduction panel control signal sg304 outputted from the panel control unit 150 is controlled so as to output the second modulation light lm307 which is reflected for 75% of a period of time 576t/1023 in which a maximum gradation R of the first modulation light lm306 is in an ON period.

Therefore, the projection light lm308 projected through the projection optical system 171 is reflected for a period of time in which both the video panel control signal sg303 and the light reduction panel control signal sg304 are in an ON period. The light is not reflected in a period of time in which either of the video panel control signal sg303 or the light reduction panel control signal sg304 is in an OFF period. As a result, the projected projection light lm308R is projected for 75% of 576t/1023 (432t/1023) of the period of time t in which one pixel is represented. Further, the projected projection lights lm308G/B are projected for 280t/1023 and 96t/1023 of the period of time t in which one pixel is represented. Therefore, desired light reduction processing has been applied to original pixel values.

As described above, in the projector 100 of the present embodiment, the gradation processing for edge blending is performed on a corresponding region in the display element 152 with respect to the three display elements 151R/G/B that display an image according to image data. At this time, the display element 152 reflects light for a period of time according to a desired light reduction ratio on the basis of a period of time in which light is reflected with respect to a color of the maximum gradation among the display elements 151R/G/B. Further, colors other than the color of the maximum gradation are controlled to have a desired brightness after the light reduction processing by using image processing, so that a color balance deviation before and after the light reduction processing is reduced. Thereby, in the same manner as in the sixth embodiment, the gradation processing can be performed regardless of the pixel values of the image data to be displayed by the display element 151, so that black floating due to the present processing does not occur.

Figure 21A:
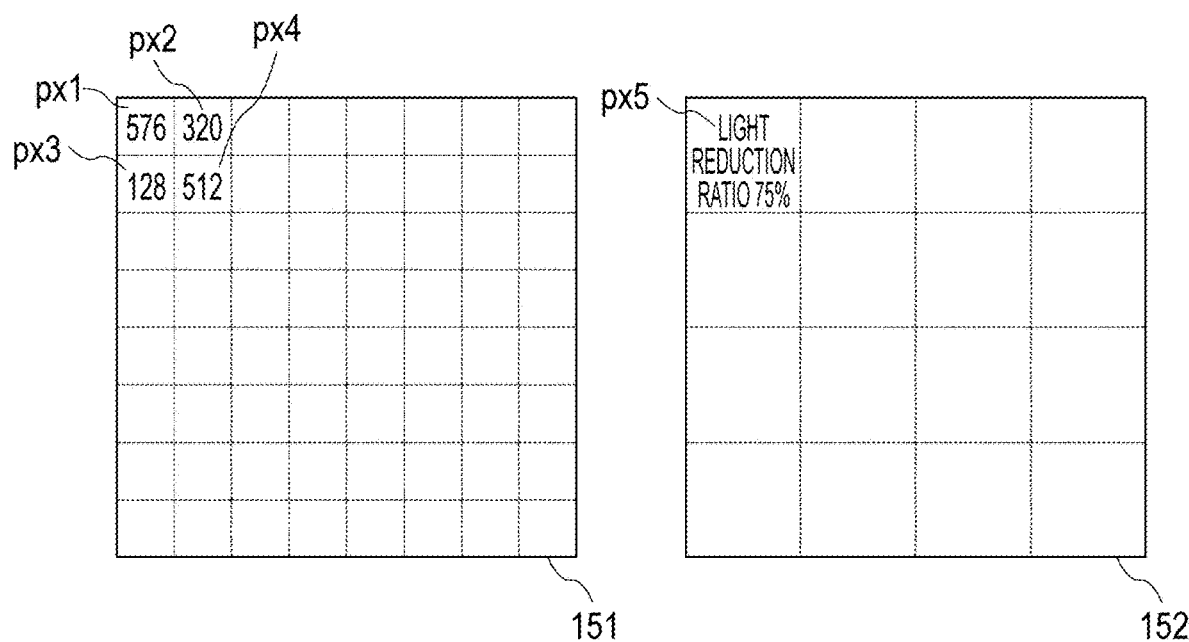
FIGS. 21A and 21B are diagrams showing a configuration to be a feature of the eighth embodiment.
Figure 21B:
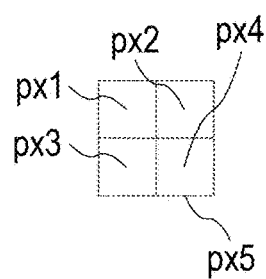

In the present embodiment, a case where the display element 151 is the three-panel type is described as a configuration in which a plurality of pixels of the display element 151 correspond to one pixel of the display element 152. However, the present embodiment is not limited to this. As shown in FIGS. 21A and 21B, the same goes for a case where a plurality of pixels px1 to px4 of the display element 151 and a pixel px5 of the display element 152 are in a correspondence relationship with each other. Here, an example is shown where the pixel px1 of the display element 151 has 576 gradations, the pixel px2 has 320 gradations, the pixel px3 has 128 gradations, the pixel px4 has 512 gradations, and light reduction of 75% is performed in the corresponding pixel px5 of the display element 152. As shown in FIG. 22A, when the light reduction processing of px5 is performed in accordance with px1 which is a pixel having the greatest gradation value among the pixels px1 to px4, a color balance deviation occurs in the pixels px2 to px4 other than the pixel px1 before and after the light reduction processing. As shown in FIG. 22B, the image processing unit 140 applies image processing according to a light reduction ratio to the pixels px2 to px4 in advance, so that it is possible to reduce the color balance deviation before and after the light reduction processing in the pixels px2 to px4 other than the pixel of the maximum gradation.

Specific image processing will be described with reference to FIGS. 22A, 22B, and 23. In the same manner as FIGS. 21A and 21B, FIG. 22B is a time chart when light of a pixel having pixel values px1=576, px2=320, px3=128, and px4=512 (the maximum pixel value is 1023) of the image is reduced to 75% as the gradation processing and projection light is outputted. In FIG. 22B, the projection light where px1=432, px2=280, px3=96, and px4=384 is outputted. In FIG. 23, as setting information, light reduction ratio information associated with light reduction processing of edge blending is transmitted from the information acquisition unit 114 to the image processing unit 140.

First, the image processing unit 140 acquires the light reduction ratio information from the information acquisition unit 114. The image processing unit 140 performs image processing on the pixels px2 to px4 other than the pixel of the maximum gradation on the basis of the light reduction ratio information. In this case, a conversion of px2=320*0.75=280, px3=128*0.75=96, and px4=512*0.75=384 is performed. Then, the image processing unit 140 outputs a synchronization signal and a data signal after the image processing as image processing signals sg302.

The video panel control signal sg303 outputted from the panel control unit 150 is a PWM signal according to pixel values 576 (px1), 280 (px2), 96 (px3), and 512 (px4) based on the image processing signals sg302. Then, the pixel values are inputted into corresponding pixels px1 to px4 of the display element 151, respectively. Considering ratios to the maximum pixel value 1023, the PWM signals that are ON for 576/1023 (px1) period of time, 280/1023 (px2) period of time, 96/1023 (px3) period of time, and 432/1023 (px4) period of time respectively, are generated. Thereby, the pixel px1 of the display element 151 is controlled so as to output the first modulation light lm306 formed by reflecting the light source light lm305 for 576t/1023 of a period of time t in which one pixel is represented. The pixel px2 of the display element 151 is controlled so as to output the first modulation light lm306 formed by reflecting the light source light lm305 for 280t/1023 of the period of time t in which one pixel is represented. Further, the pixel px3 of the display element 151 is controlled so as to output the first modulation light lm306 formed by reflecting the light source light lm305 for 96t/1023 of the period of time t in which one pixel is represented. Furthermore, the pixel px4 of the display element 151 is controlled so as to output the first modulation light lm306 formed by reflecting the light source light lm305 for 512t/1023 of the period of time t in which one pixel is represented.

The light reduction panel control signal sg304 outputted from the panel control unit 150 is controlled so as to output the second modulation light lm307 which is reflected for 75% of a period of time 576t/1023 in which a maximum gradation px1 of the first modulation light lm306 is in an ON period.

Therefore, the projection light lm308 projected through the projection optical system 171 is reflected for a period of time in which both the video panel control signal sg303 and the light reduction panel control signal sg304 are in an ON period. The light is not reflected in a period of time in which either of the video panel control signal sg303 or the light reduction panel control signal sg304 is in an OFF period. As a result, light corresponding to px1 of the projected projection light lm308 is projected for 75% of 576t/1023 (432t/1023) of the period of time t in which one pixel is represented. Further, lights corresponding to px2 to px4 are projected for 280t/1023, 96t/1023, and 432t/1023, respectively, of the period of time t in which one pixel is represented. Therefore, it is possible to apply desired light reduction processing to original pixel values.

The present disclosure provides technological improvements or unconventional solutions in advancements and/or improvements in projection technology through use of specific manners of use with specific limitations on available data and configurational states, where, for example, gradation processing can be performed at high resolution, so to improve the image quality of overlapping regions.

Other Embodiments

Embodiment(s) of the present disclosure can also be realized by a computerized configuration(s) of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computerized configuration(s) of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computerized configuration(s) may comprise one or more processors, one or more memories (e.g., central processing unit (CPU), micro processing unit (MPU)), and may include a network of separate computers or separate processors to read out and execute the computer executable instructions. The computer executable instructions may be provided to the computerized configuration(s), for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™) a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2017-155264, filed 2017 Aug. 10, and Japanese Patent Application No. 2018-081159, filed 2018 Apr. 20 which are each hereby incorporated by reference herein in their entirety.

What is claimed is:

1. A projection apparatus that projects a projection image, the projection apparatus comprising:
    a first panel;
    a second panel;
    a projection optical system configured to project light that has passed through the first panel and the second panel;
    an information acquisition unit configured to acquire light reduction information of a region which is a part of the projection image and overlaps with an image projected by another projection apparatus; and
    a panel control unit configured to control the first panel based on at least data of the projection image, and control the second panel based on at least the light reduction information,
    wherein the first panel and the second panel are arranged such that light that has passed through the first panel enters the second panel or light that has passed through the second panel enters the first panel,
    wherein the first panel is a panel that represents gradation by time-modulating optical characteristics of pixels or a panel that represents gradation by amplitude-modulating optical characteristics of pixels, and
    wherein the second panel is a panel that represents gradation by time-modulating optical characteristics of pixels or a panel that represents gradation by amplitude-modulating optical characteristics of pixels.

2. The projection apparatus according to claim 1, wherein
    the information acquisition unit acquires a deformation instruction for deforming the projection image, and
    the panel control unit controls optical characteristics of pixels corresponding to a shape of the projection image that has been deformed based on the deformation instruction in the first panel and the second panel.

3. The projection apparatus according to claim 1, wherein
    the information acquisition unit further acquires a movement instruction for moving a projection position of the projection image, and
    the panel control unit controls optical characteristics of pixels corresponding to a position of the projection image that has been moved based on the movement instruction in the first panel and the second panel.

4. The projection apparatus according to claim 1, wherein
    the panel control unit determines whether to perform control based on the light reduction information in the first panel or in the second panel based on magnitude of image quality disturbance in the region estimated from the light reduction information and the data of the projection image.

5. The projection apparatus according to claim 1, wherein
    the panel control unit controls the second panel when intensity of light that is reflected by or transmits through pixels of the first panel corresponding to the region estimated from the light reduction information and the data of the projection image is less than or equal to a predetermined value.

6. The projection apparatus according to claim 1, wherein when the panel control unit adjusts luminance of the projection image by the first panel, the panel control unit performs control so that the second panel becomes a total transmission state or a total reflection state.

7. The projection apparatus according to claim 1, wherein resolution of the second panel is less than resolution of the first panel.

8. The projection apparatus according to claim 1, wherein
    the first panel is the panel that represents gradation by time-modulating optical characteristics of pixels and the second panel is the panel that represents gradation by time-modulating optical characteristics of pixels.

9. The projection apparatus according to claim 8, wherein
    the panel control unit time-modulates optical characteristics of each pixel of the second panel based on the light reduction information during a period of time in which the panel control unit time-modulates optical characteristics of pixels of the first panel corresponding to each pixel of the second panel based on the data of the projection image.

10. The projection apparatus according to claim 9, wherein
    the first panel has a plurality of panels, and
    the panel control unit controls each pixel of the second panel based on a pixel, which takes longest time for light to be reflected or pass through, among pixels of the plurality of panels corresponding to each pixel of the second panel.

11. The projection apparatus according to claim 9, further comprising:
    an image processing unit configured to process the data of the projection image based on the light reduction information,
    wherein the image processing unit processes data related to pixels other than a pixel, which takes longest time for light to be reflected or pass through, among pixels of the plurality of panels corresponding to each pixel of the second panel.

12. The projection apparatus according to claim 9, wherein
    when a pixel of the second panel and a plurality of pixels of the first panel correspond to each other,
    the panel control unit time-modulates optical characteristics of the pixel of the second panel corresponding to the plurality of pixels based on the light reduction information during a period of time in which the panel control unit time-modulates optical characteristics of a pixel having a highest gradation value among the plurality of pixels.

13. The projection apparatus according to claim 9, wherein
    when a pixel of the second panel and a plurality of pixels of the first panel correspond to each other,
    the image processing unit processes data related to pixels other than a pixel having a highest gradation value among the plurality of pixels based on the light reduction information.

14. The projection apparatus according to claim 1, wherein
    the first panel is the panel that represents gradation by time-modulating optical characteristics of pixels and the second panel is the panel that represents gradation by amplitude-modulating optical characteristics of pixels.

15. The projection apparatus according to claim 14, wherein
    the panel control unit amplitude-modulates optical characteristics of each pixel of the second panel based on the light reduction information during a period of time in which the panel control unit time-modulates optical characteristics of pixels of the first panel corresponding to each pixel of the second panel based on the data of the projection image.

16. The projection apparatus according to claim 15, wherein
the first panel and the second panel are liquid crystal panels.

17. The projection apparatus according to claim 1, wherein
the first panel is the panel that represents gradation by amplitude-modulating optical characteristics of pixels and the second panel is the panel that represents gradation by time-modulating optical characteristics of pixels.

18. The projection apparatus according to claim 17, wherein
the panel control unit time-modulates optical characteristics of each pixel of the second panel based on the light reduction information during a period of time in which the panel control unit amplitude-modulates optical characteristics of pixels of the first panel corresponding to each pixel of the second panel based on the data of the projection image.

19. The projection apparatus according to claim 1, wherein
the first panel is the panel that represents gradation by amplitude-modulating optical characteristics of pixels and the second panel is the panel that represents gradation by amplitude-modulating optical characteristics of pixels.

20. The projection apparatus according to claim 19, wherein
the panel control unit amplitude-modulates optical characteristics of each pixel of the second panel based on the light reduction information during a period of time in which the panel control unit amplitude-modulates optical characteristics of pixels of the first panel corresponding to each pixel of the second panel based on the data of the projection image.

21. A control method of a projection apparatus which has a first panel, a second panel, and a projection optical system that projects light that has passed through the first panel and the second panel and which projects a projection image, the control method comprising:

acquiring light reduction information of a region which is a part of the projection image and overlaps with an image projected by another projection apparatus; and
controlling the first panel based on data of the projection image and controlling the second panel based on the light reduction information,
wherein the first panel and the second panel are arranged such that light that has passed through the first panel enters the second panel or light that has passed through the second panel enters the first panel,
wherein the first panel is a panel that represents gradation by time-modulating optical characteristics of pixels or a panel that represents gradation by amplitude-modulating optical characteristics of pixels, and
wherein the second panel is a panel that represents gradation by time-modulating optical characteristics of pixels or a panel that represents gradation by amplitude-modulating optical characteristics of pixels.

22. A non-transitory computer-readable storage medium storing a program for causing a computer to execute a control method of a projection apparatus which has a first panel, a second panel, and a projection optical system that projects light that has passed through the first panel and the second panel and which projects a projection image, the control method comprising:

acquiring light reduction information of a region which is a part of the projection image and overlaps with an image projected by another projection apparatus; and
controlling the first panel based on data of the projection image and controlling the second panel based on the light reduction information,
wherein the first panel and the second panel are arranged such that light that has passed through the first panel enters the second panel or light that has passed through the second panel enters the first panel,
wherein the first panel is a panel that represents gradation by time-modulating optical characteristics of pixels or a panel that represents gradation by amplitude-modulating optical characteristics of pixels, and
wherein the second panel is a panel that represents gradation by time-modulating optical characteristics of pixels or a panel that represents gradation by amplitude-modulating optical characteristics of pixels.

* * * * *